United States Patent [19]

Sporer

[11] Patent Number: 5,122,908
[45] Date of Patent: Jun. 16, 1992

[54] NON-LINEAR CONTROLLER FUNCTIONS FOR INERTIAL OPTICAL STABILIZERS

[75] Inventor: Stephen F. Sporer, Oakland, Calif.
[73] Assignee: Tinsley Laboratories, Inc., Richmond, Calif.
[21] Appl. No.: 341,619
[22] Filed: Apr. 21, 1989
[51] Int. Cl.⁵ .................................... G02B 27/64
[52] U.S. Cl. ........................... 359/557; 359/554
[58] Field of Search ............... 350/500, 320; 244/171, 244/164; 364/150, 162; 340/870.27; 356/138-153; 359/554-557

[56] References Cited

U.S. PATENT DOCUMENTS

| | | | |
|---|---|---|---|
| 3,756,686 | 9/1973 | Humphrey | 350/500 |
| 3,892,467 | 7/1975 | Shin | 350/500 |
| 4,013,339 | 3/1977 | Ando et al. | 350/500 |
| 4,123,164 | 10/1978 | Tambor | 356/149 |
| 4,315,610 | 2/1982 | Malueg | 356/149 |
| 4,387,971 | 6/1983 | Grove et al. | 350/500 |
| 4,393,597 | 7/1983 | Picard et al. | 356/149 |
| 4,623,930 | 11/1986 | Ohima et al. | 350/500 |
| 4,911,541 | 3/1990 | Alvarez et al. | 350/500 |
| 4,911,541 | 3/1990 | Alvarez et al. | 359/557 |

Primary Examiner—Bruce Y. Arnold
Assistant Examiner—Thong Nguyen
Attorney, Agent, or Firm—Townsend and Townsend

[57] ABSTRACT

A stabilizing controller system is disclosed for passive inertial stabilizers having case mounted optics moving in combination with inertially suspended optics to stabilize images against accidental angular motion. The controller system utilizes second terms to resolve the conflict between weak coupling for good stabilization and strong coupling for good panning. The controller system, applicable to either the preferred pendulum type or to gyro stabilized systems, includes the use of non-linear functions for both first and second order restoring forces. A relationship utilizing the critical damping function is disclosed between applicable first and second order controller functions and their applicable constants to enable uniform controller system response. Examples of the controller function are applied to an inertial pendulum stabilizer and a gyroscope stabilizer. The inertial pendulum stabilizer is illustrated in a polar displacement and restoration embodiment and a preferred gimbaled displacement and restoration embodiment. Functions are set forth for non-coincidence of sensors and torque motors on the gimbal axes. There results a controller function imposed on the inertial stabilizer from the case which imparts substantially linear forces of correction for pendulum excursion adjacent the line of sight. Non-linear and increasing forces are applied for movement outside of the linear range. Improved panning results.

20 Claims, 14 Drawing Sheets

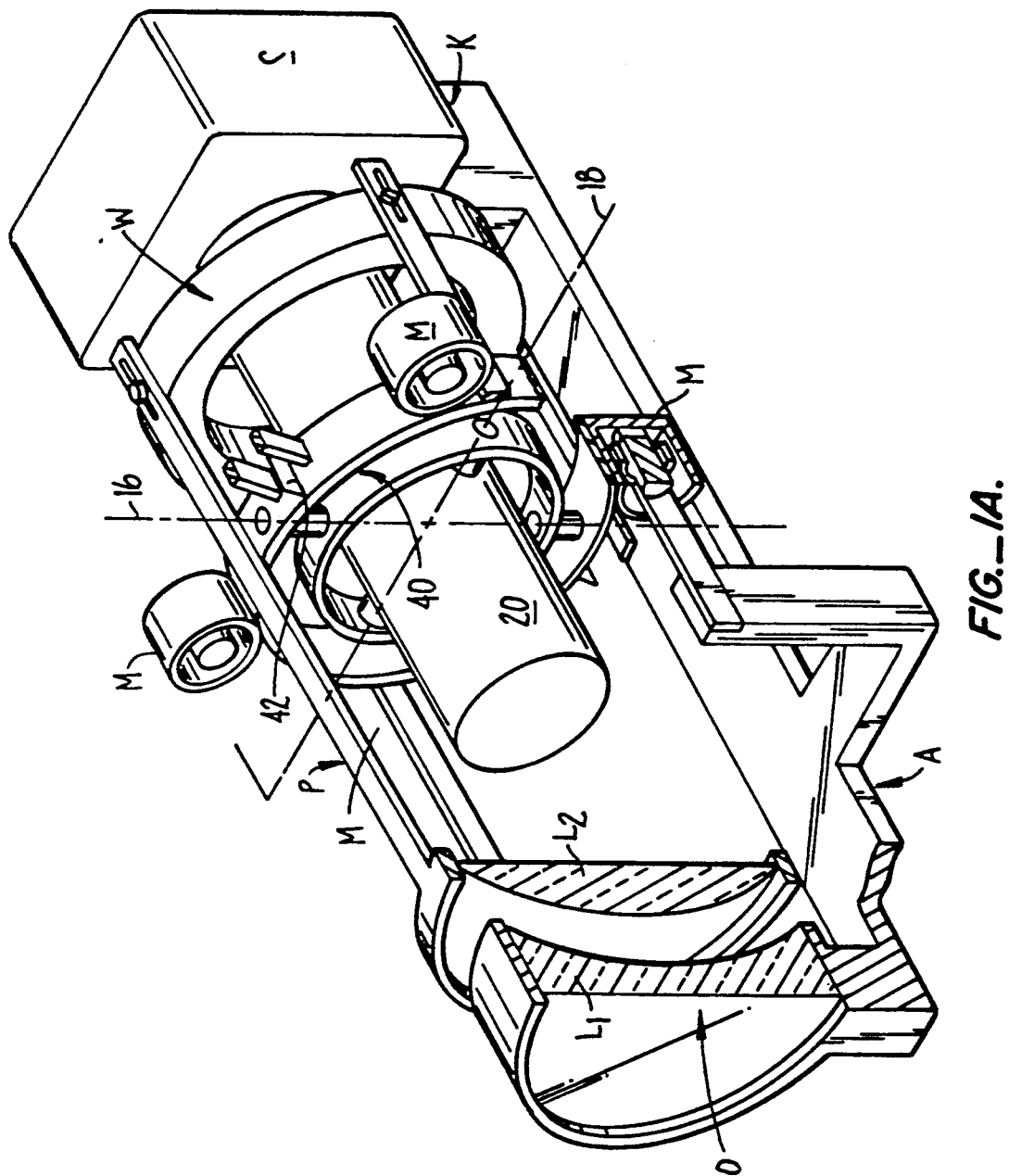
FIG._1A.

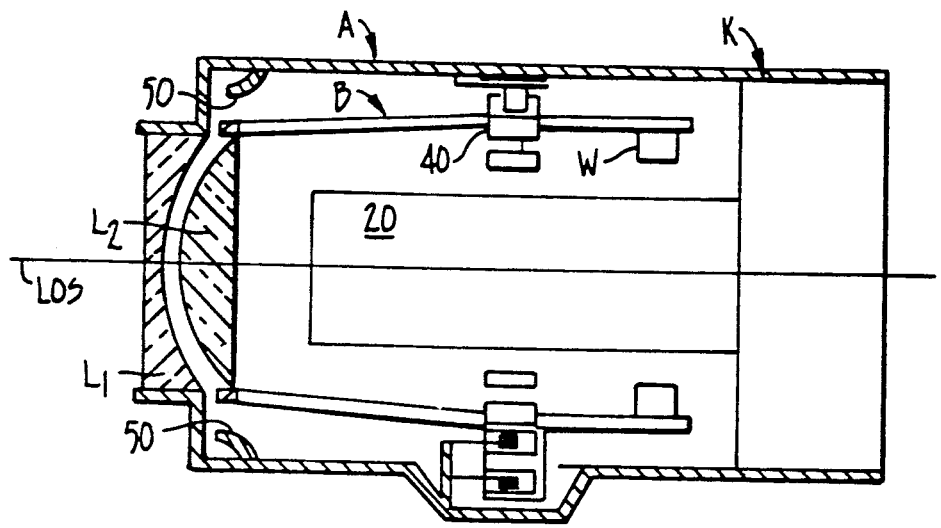
FIG._1B.
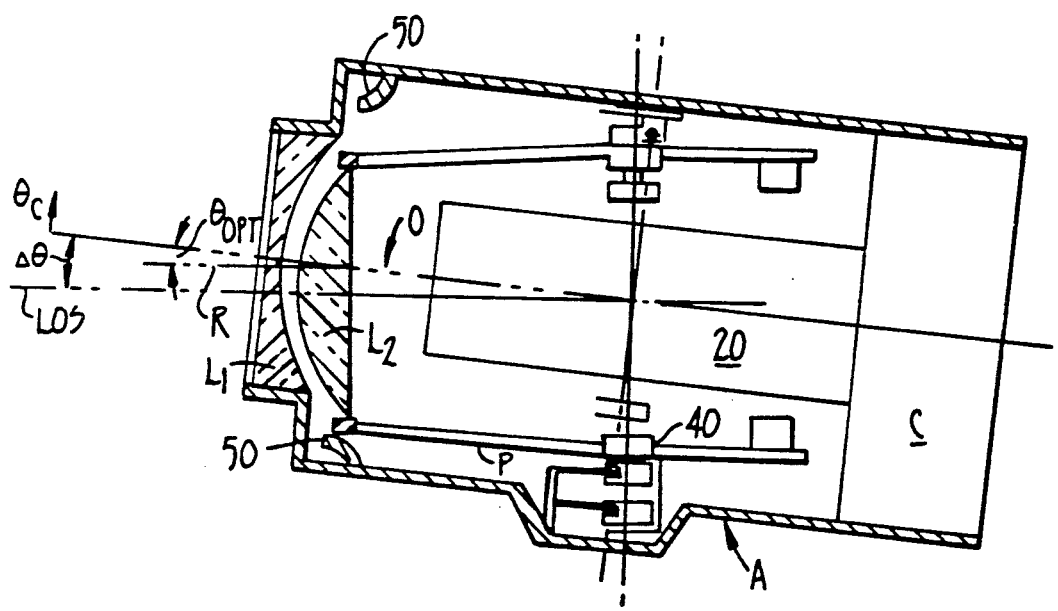
FIG._2.

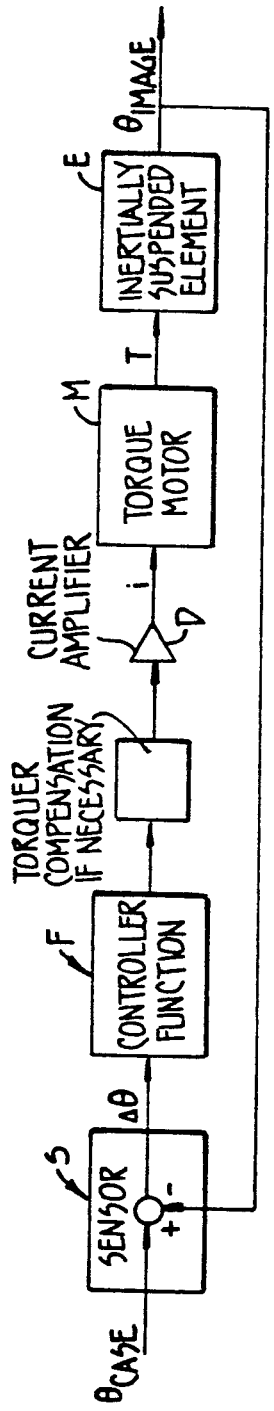
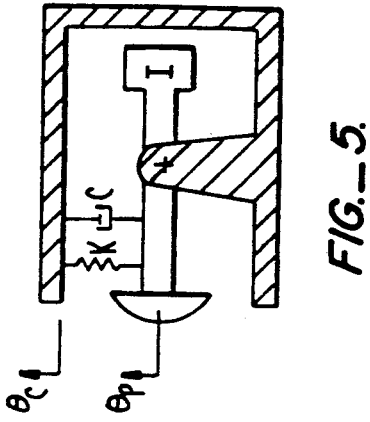
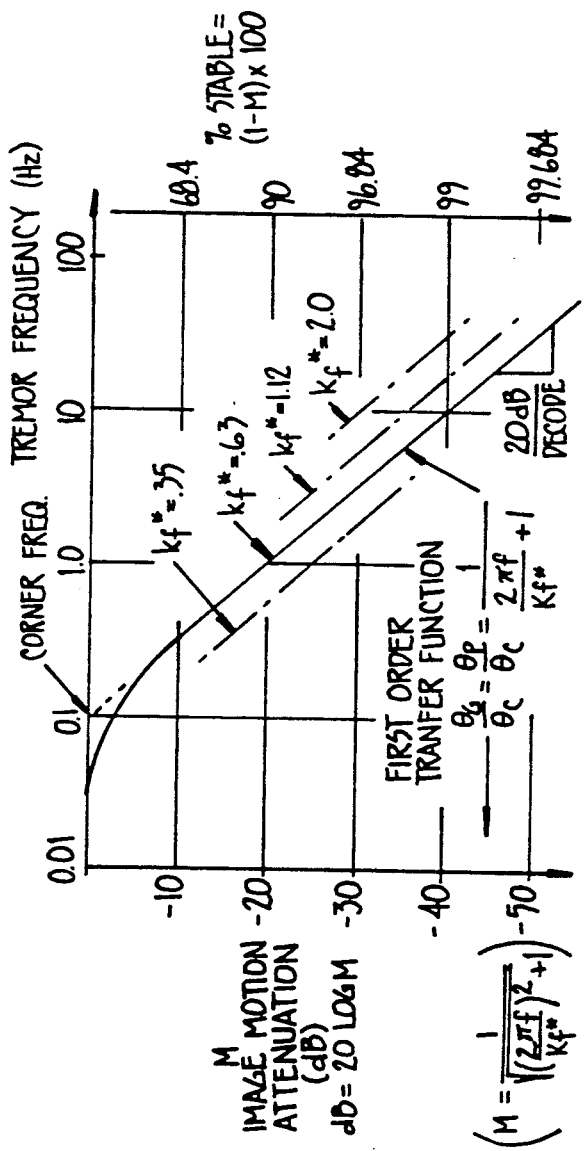
FIG._3.
FIG._5.
FIG._4.

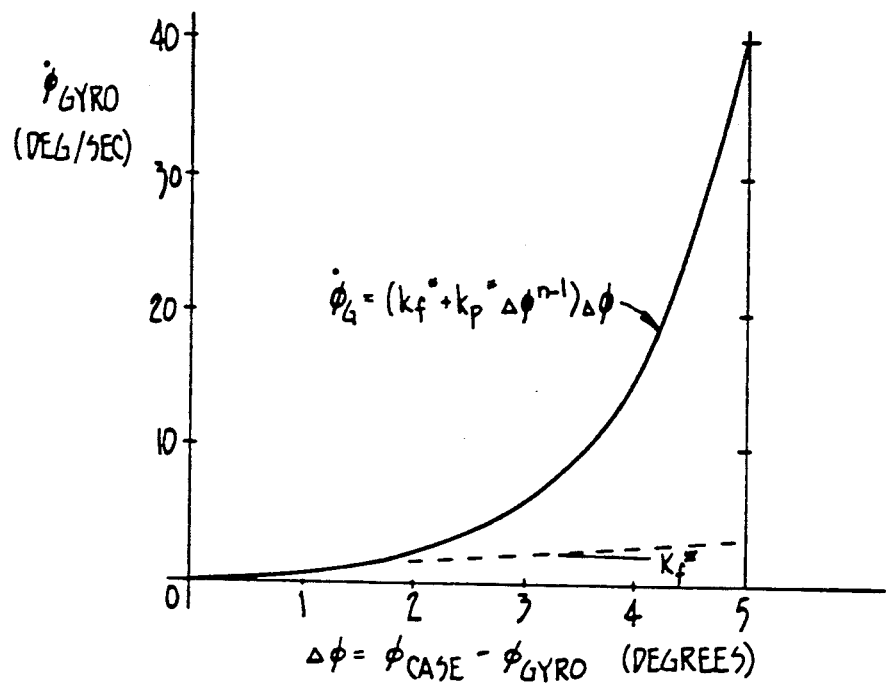
FIG._6.
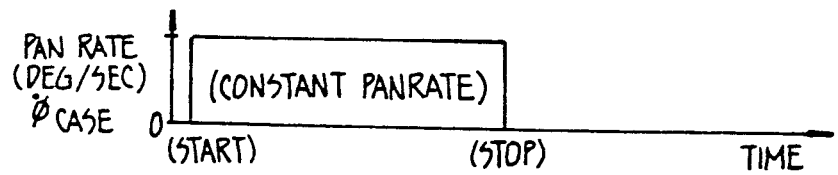
FIG._7A.
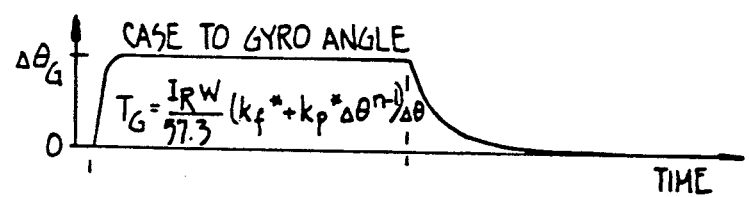
FIG._7B.
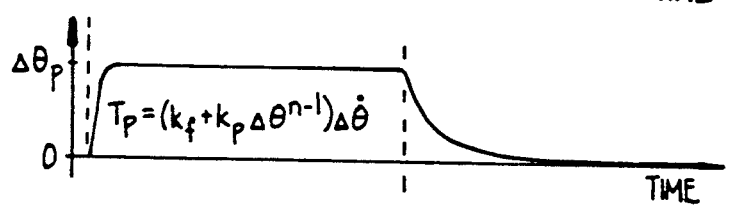
FIG._7C.
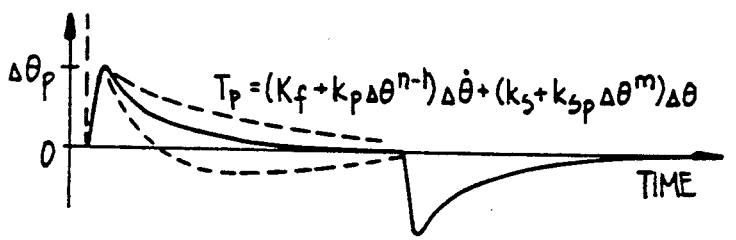
FIG._7D.

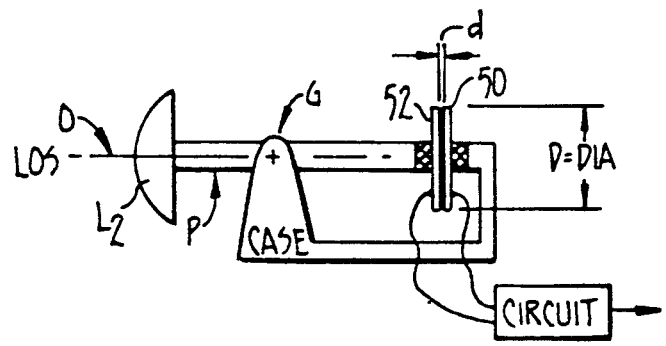
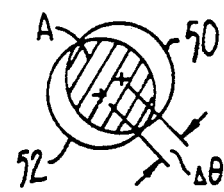
FIG._8A.  FIG._8C.
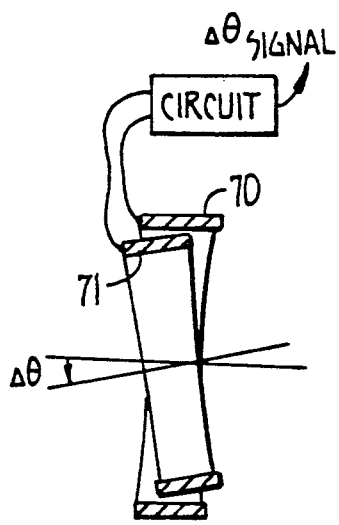
FIG._8B.
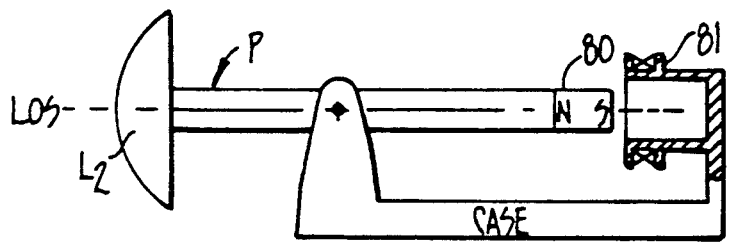
FIG._9A.
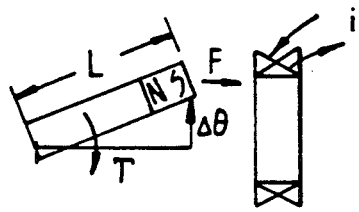
FIG._9B.

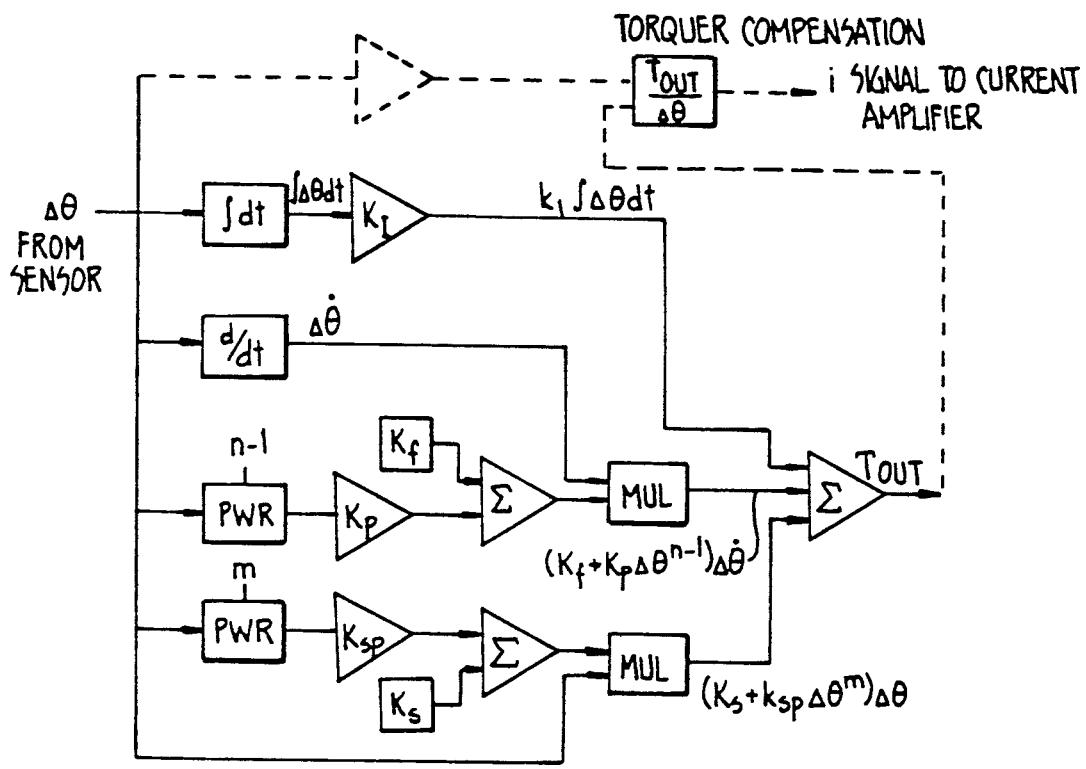
$$T_{OUT} = (K_f + k_p \Delta\theta^{n-1})\Delta\dot\theta + (k_s + k_{sp}\Delta\theta^m)\Delta\theta + k_I \int \Delta\theta \, dt$$
$\Delta\theta$ IS THE OUTPUT OF THE SENSOR
$T_{OUT}$ IS PROPORTIONAL TO THE APPLIED TORQUE
FIG._10.

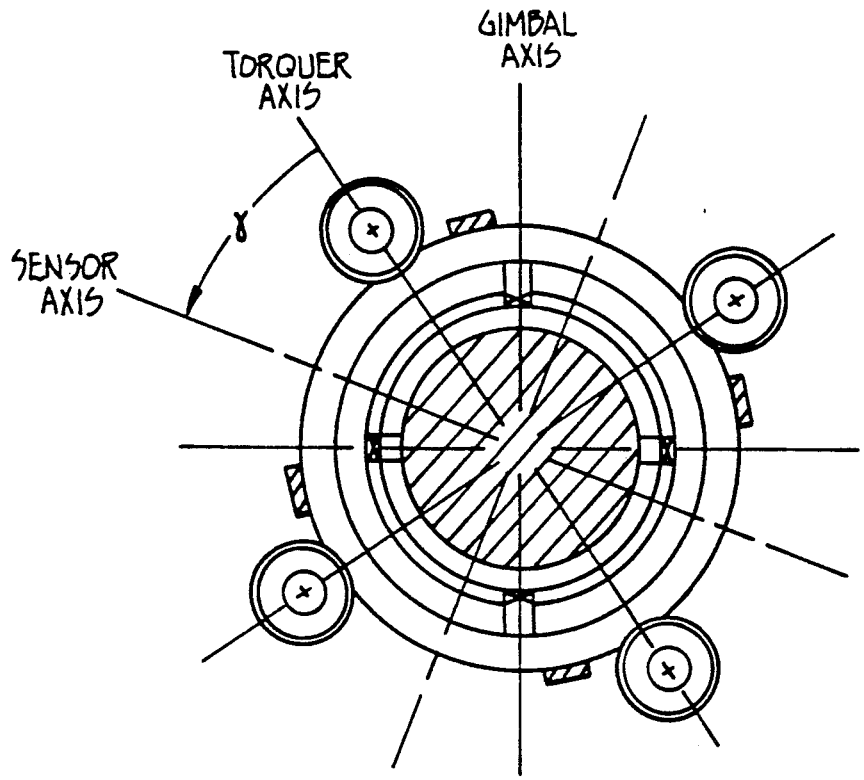
FIG._11.
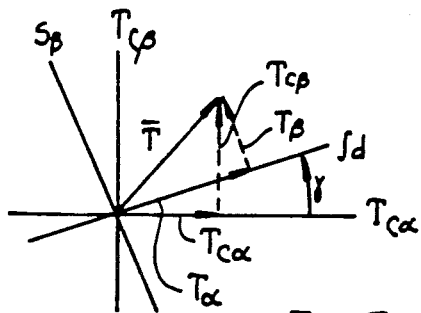
$T_{c\alpha} = T_\alpha \cos\gamma - T_\beta \sin\gamma$
$T_{c\beta} = T_\alpha \sin\gamma + T_\beta \cos\gamma$
FIG._12A.
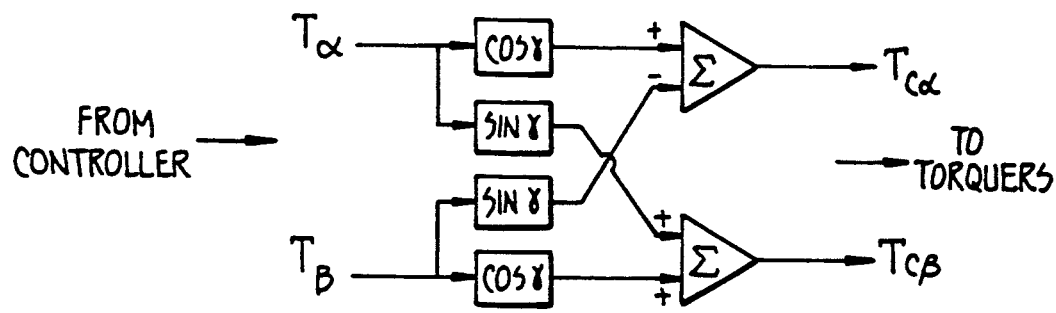
FIG._12B.

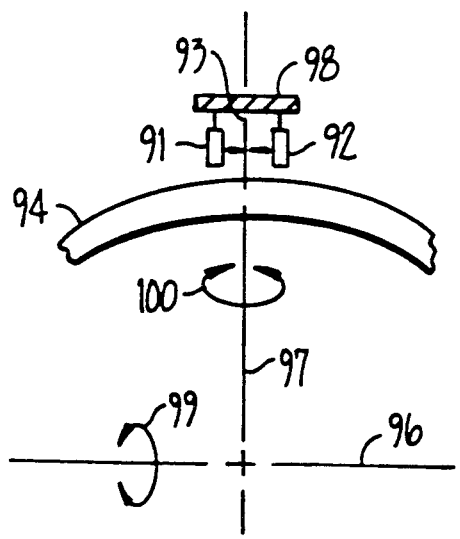
FIG._13A.
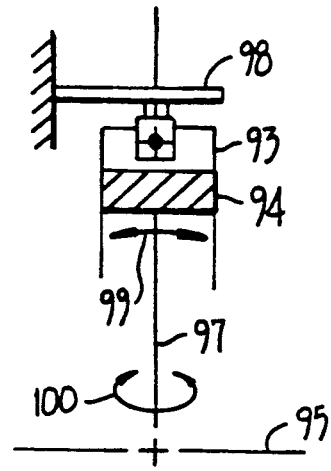
FIG._13B.
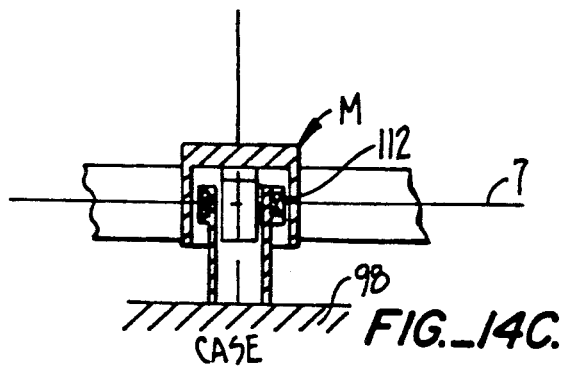
FIG._14C.
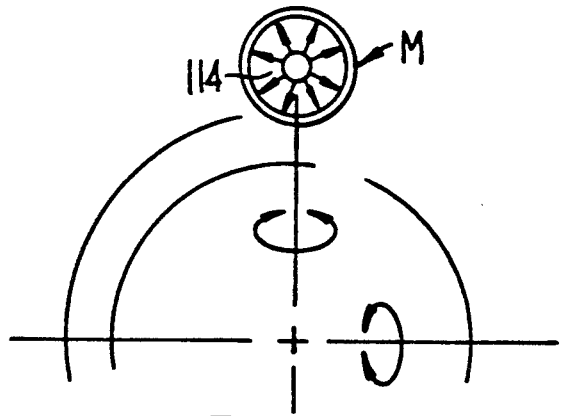
FIG._14B.
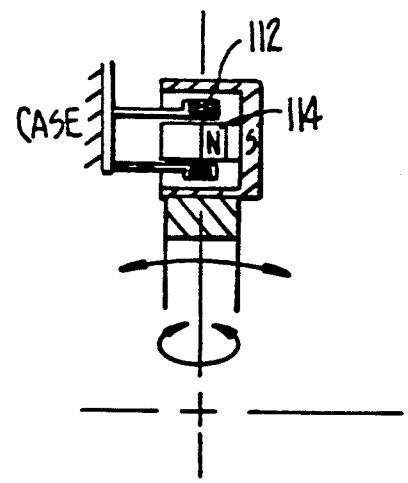
FIG._14A.

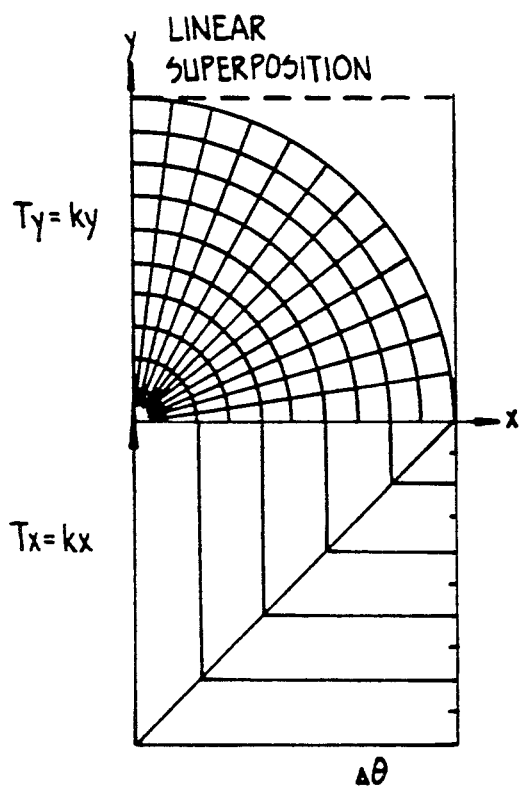
FIG._15A.
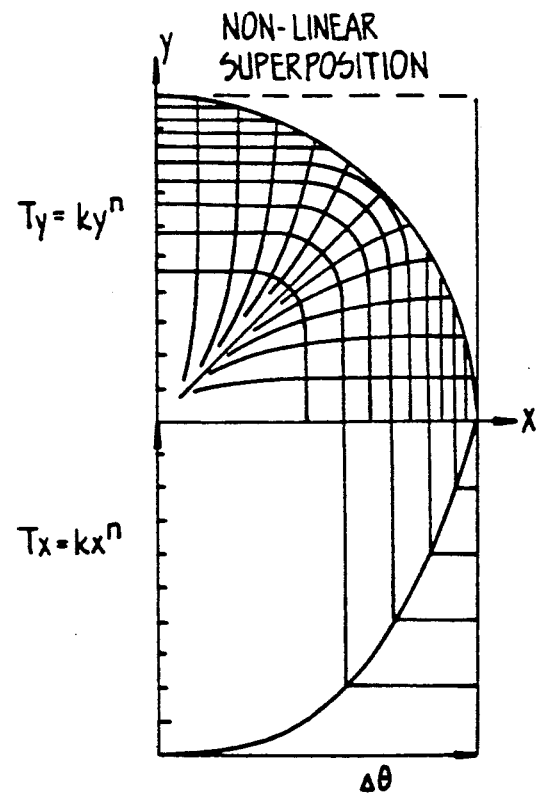
FIG._15B.
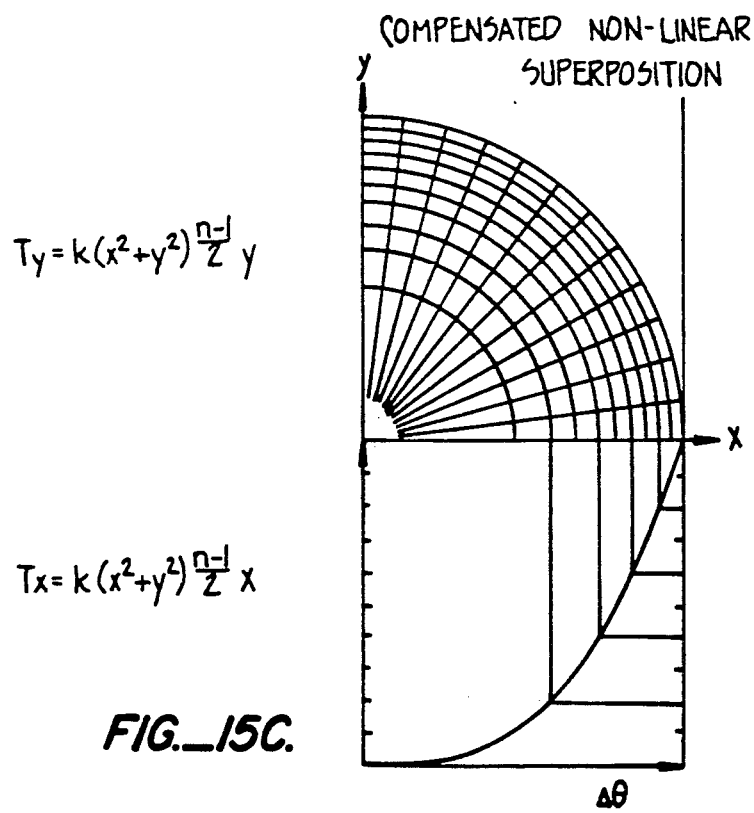
FIG._15C.

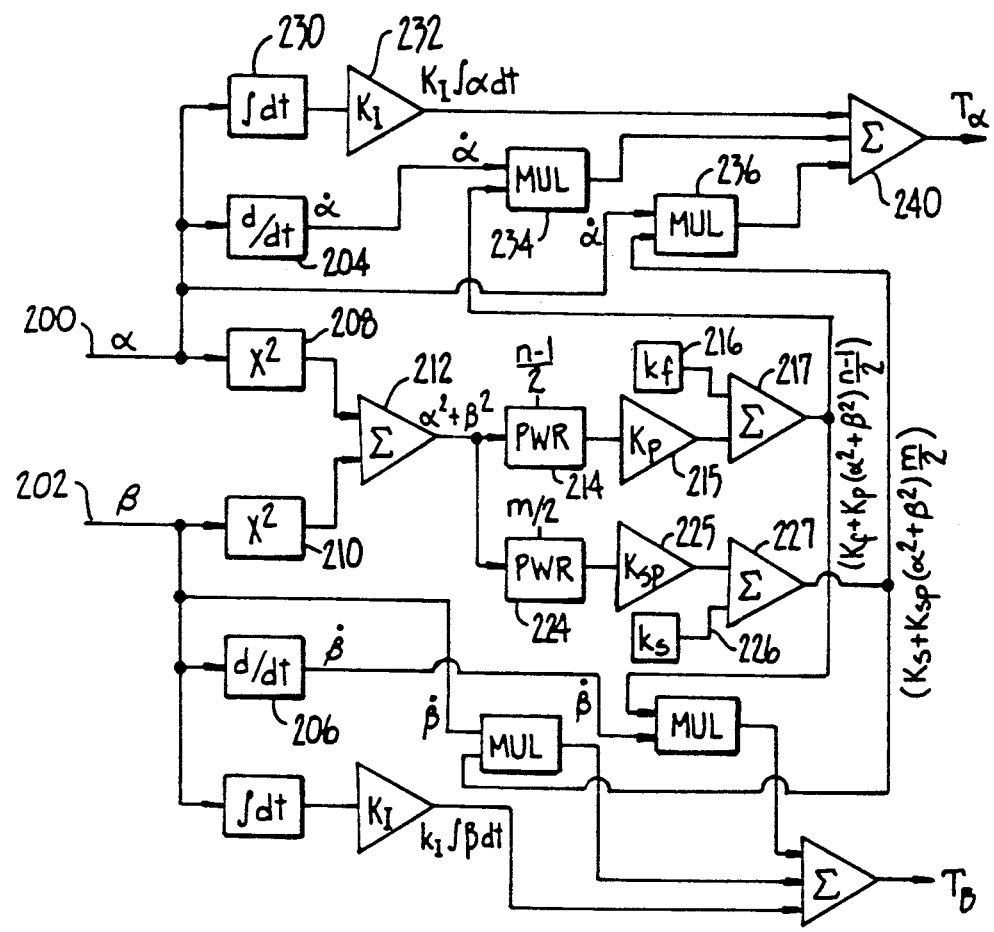

[32] $T_\alpha = (K_f + K_p(\alpha^2+\beta^2)\frac{n-1}{2})\dot{\alpha} + (K_s + K_{sp}(\alpha^2+\beta^2)\frac{m}{2})\alpha + K_I\int\alpha\,dt$

[33] $T_\beta = (K_f + K_p(\alpha^2+\beta^2)\frac{n-1}{2})\dot{\beta} + (K_s + K_{sp}(\alpha^2+\beta^2)\frac{m}{2})\beta + K_I\int\beta\,dt$ $\alpha, \beta$ ARE THE TWO ORTHOGONAL SENSOR OUTPUTS $T_\alpha, T_\beta$ ARE PROPORTIONAL TO THE APPLIED TORQUES IN $\alpha, \beta$ AXES RESPECTIVELY

FIG._16.

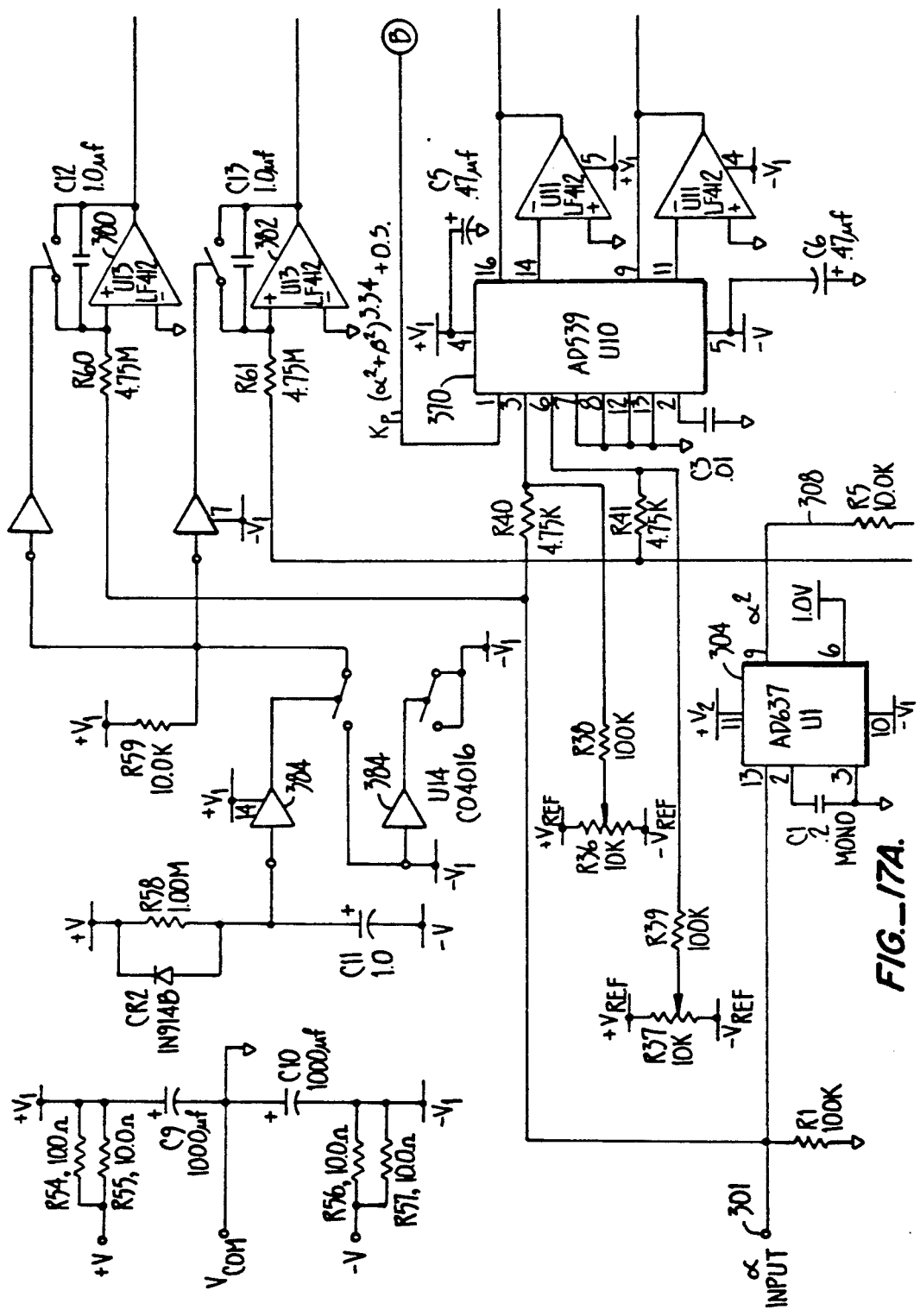
FIG._17A.

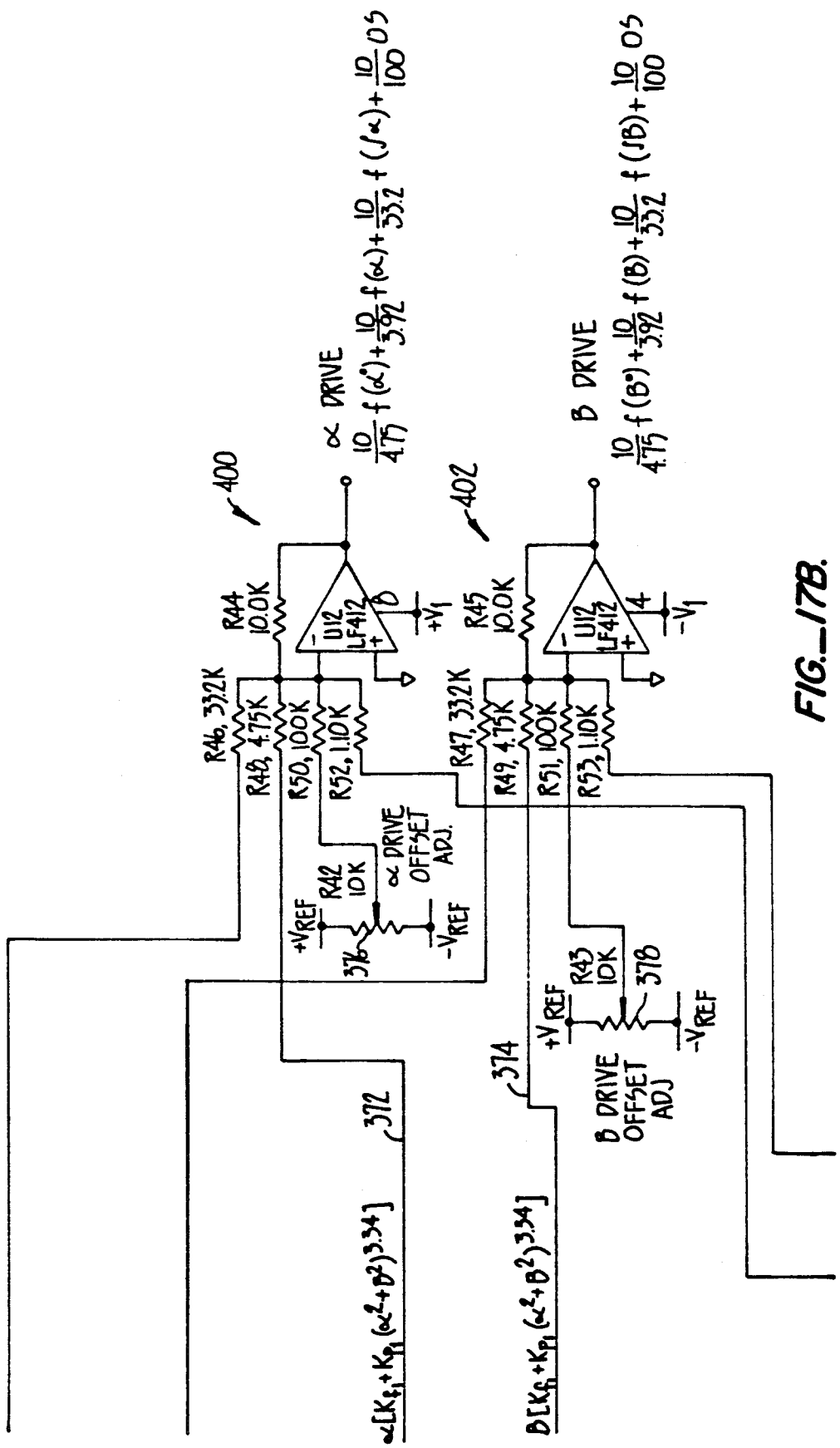
FIG._17B.

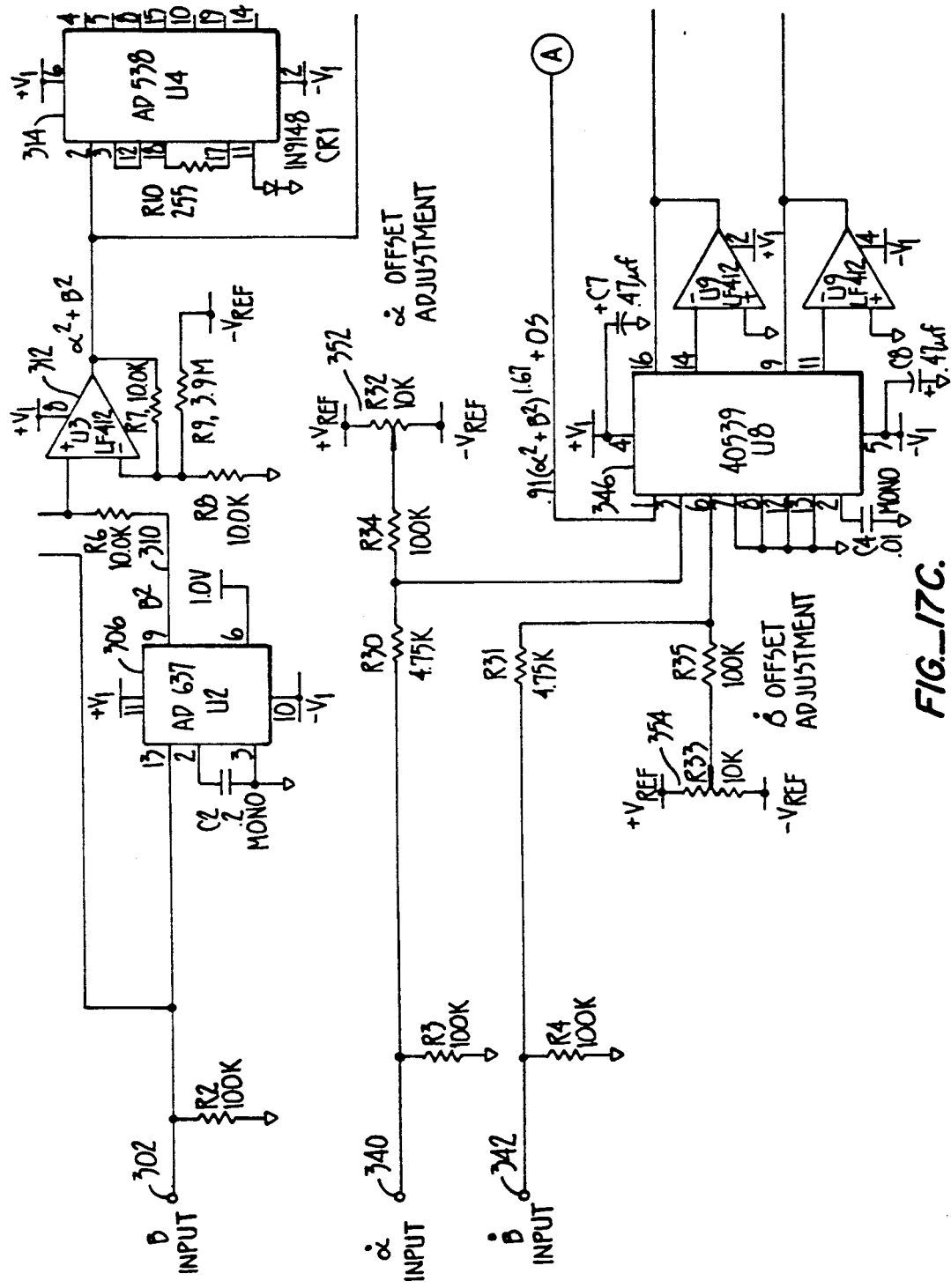
FIG._17C.

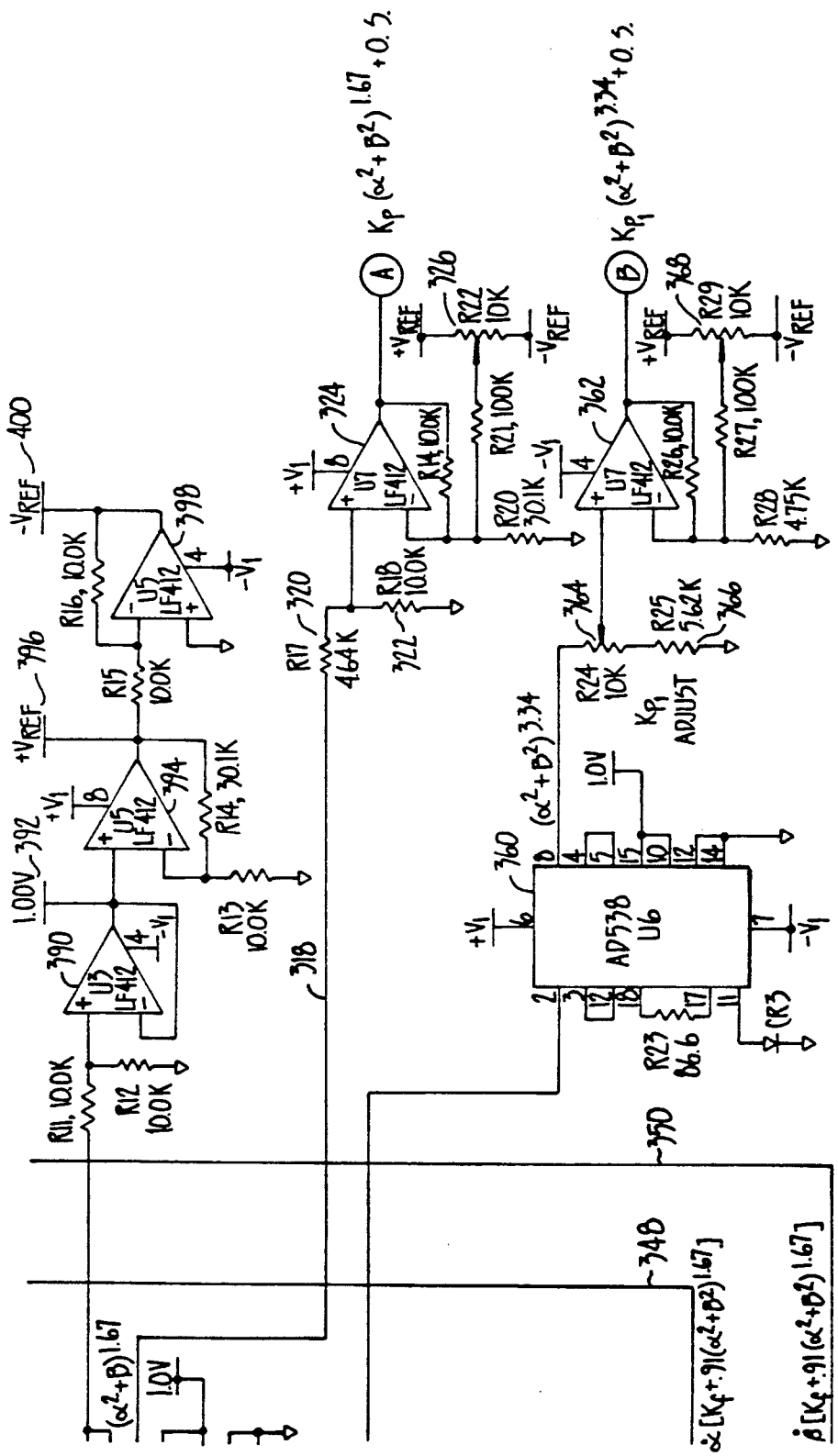

NON-LINEAR CONTROLLER FUNCTIONS FOR INERTIAL OPTICAL STABILIZERS

BACKGROUND OF THE INVENTION

This invention relates to inertial optical stabilizers so that optical instruments can be stabilized against image vibration when subjected to accidental vibration along angular coordinates orthogonal to the line of sight. More particularly, this invention relates to the servo system used to control the motion of the inertially stabilizing optical element. The purpose of this invention is to provide an apparatus and a method for improved coupling between the case and the stabilizing optical element, which allows for improved panning response while maintaining good stabilization.

SUMMARY OF THE PRIOR ART

Optical stabilization is known. Typically, an optical instrument having a lens train for the collection or the emission of light is subjected to accidental angular motion. Examples of such instruments are cameras, binoculars, or laser pointing systems.

The accidental angular motion typically comes from ambient vibrations. The ambient vibrations can include hand tremor or vibrations of a vehicle, boat or aircraft. Without compensation of these vibrations, the optical instrument is greatly reduced in effectiveness and often rendered useless.

Stabilization with reference to inertial space is usually preferred.

In this document the usage of the word "inertial" to describe stabilization will refer to passive stabilizers, those that function due to the passive inertial action of a suspended optical element. This definition is opposed to active stabilizers which require active movement of a non-inertially stabilized optical element according to an inertially sensed reference. This disclosure is not applicable to active stabilizers.

Inertially referenced optical stabilizers can be divided basically into two categories:

The first is the active type which stabilizes by actively moving an optical element to a know position in the case to compensate for the unwanted case motion. Inertial sensors typically mounted to the case provide a reference signal which is used in establishing the desired position of the compensating element in the instrument. Motors then move the stabilizing element to compensate for case motion. The performance of this type of stabilizer is therefore limited by the accuracy of the inertial sensors and the positioning components in the control loop. In addition, the motor forces applied to the stabilizing element encounter inertial resistance to the desired motion thereby severely curtailing the higher frequency performance.

This invention relates to the second type of optical stabilizers which are called passive or "inertial" because they are based on the self-inertia of a compensating optical element and do not require the application of outside forces to achieve stabilization. Stabilization is inherent in the geometry of the optics and the suspension of the inertial element. One of the major advantages of this type of stabilizer is that no power input is required for stabilization. Another advantage is that the stabilization typically improves with increasing tremor frequency owing to the reliance on an inertial mass.

For examples of passive inertial stabilizers in the prior art refer to:

A) Alvarex and Sporer U.S. Patent application 07/178,104 now U.S. Pat. No. 4,911,541 entitled Inertial Pendulum Stabilizer which shows an inertial pendulum stabilizer with a positive lens element inertially suspended. A complimenting negative element is fixed to the case creating in essence a variable prism due to the relative movement of the positive and negative elements.

B) Alvarex et al. In U.S. Pat. No. 4,615,590 (Optically Stabilized Camera Lens System) shows a passive inertial gyro stabilizer applied to a zoom lens system. Stabilization is achieved by triple reflection in an inertially suspended reflecting and displacing prism system. The gyro both supplements and complicates the inertial properties of the suspended element.

Passive optical stabilizers typically include two sets of optics: first, case mounted optical elements which move with the case, and second, inertially suspended optical elements which are stabilized with reference to inertial space. This reference to inertial space occurs by the compensating optics either remaining angularly stationary with respect to inertial space or moving proportionately with respect to a spacial reference by inertial force alone.

The inertially suspended element can in general be a lens element, mirror, or a prism strategically located and pivoted in the case to provide for deviation of the optical axis line of sight (LOS) equal and opposite to case motion. The optical portion of the inertially suspended element is usually to the front of the system. Other locations can be used as well. For example, the optical portion of the stabilizer can be within the lens train of the optical instrument. The inertially suspended element is typically mounted for two orthogonal angular degrees of freedom with respect to the LOS. Thus the inertially suspended element is provided with a spacial mechanical freedom, typically of conical shape, for the inertial element with respect to the case. The axis of revolution of the cone is normally substantially parallel to the LOS. This type of mount of the inertially stabilized element might be a two-axis gimbal, a system of flexures, or a buoyantly suspended optical element in a fluid of equal density.

The inertially suspended element is mechanically neutrally balanced by adjusting its center of mass to coincide with the center of pivot (which normally lies on the optical axis) eliminating effects due to gravity or lateral accelerations. The combined effect of the inertially suspended optical elements and the case-fixed optical elements is chosen to produce image motion equal and opposite to the image motion that would be produced solely by the accidental angular case motion. Image stabilization results.

So it is apparent that the stabilization performance of an inertial optical stabilizer is improved to the extent that the motion of the inertially suspended element is decoupled from the motion of the case. Perfect geometric stability results upon complete decoupling of the suspended element from the case. However, in order to permit such instruments to undergo required panning and pointing of the instrument, restoring forces must be applied to allow the suspended element to follow the case for large angles of case motion.

However, there are two conflicting requirements for acceptable performance of the system. First, weak coupling is required for good stability. And second, strong coupling is required for good panning.

The application of the coupling forces has constituted a difficult problem for the prior art.

Typically, the weak coupling required in the stable region limits the maximum pan rate using a linear servo to a practical value of only a few (1 to 3) degrees per sec and certainly less than 5 deg/sec. When rapid panning of this instrument occurs, the inertial element frequently impacts the limits of its motion relative to the instrument. Unacceptable erratic rebounding vibration and corresponding rebounding vibration of the image occurs. This is particularly a problem with gyro stabilized systems due to the gyroscopic precession which sends the gyro tumbling in the direction 90 degrees from the direction of the case impact. To be able to pan the instrument to follow moving objects a pan rate of at least 30 deg/sec to preferably greater than 60 deg/sec is typically desired.

The prior art discloses schemes for applying linear servo control theory to pendulum type stabilizers pursuant to spring, damping, and integral restoring forces. For example see Humphrey U.S. Pat. No. 3,756,686, issued Sep. 4, 1973, entitled Servo Integrating Stabilizer. The restoring forces applied are linearly proportional to the relative position, velocity, and time-integrated position with respect to the case.

An attribute of linear servo systems as applied to two-axis stabilizers is that the two orthogonal servo axes are decoupled and can be treated independently according to the principle of linear superposition. This means that the displacement of each discrete gimbal axis and the corresponding restoring force generated for that displaced discrete gimbal axis are independent from the remaining gimbal axis and the force generated for that gimbal axis. Humphrey U.S. Pat. No. 3,756,686 is an example of such a system.

Restoring forces for each gimbal axis are generated only from the displacement of that very same gimbal axis. The two independent linear servo axes can be superimposed to yield the same coupling result for all other azimuth angles of panning between the two servo axes. No account is taken of the displacement of one gimbal axis for generating forces in the other gimbal axis.

It is also well known in the prior art to provide optical stabilizers with gyros. Such gyros introduce numerous complications. For understanding the simplicity of this disclosure herein (especially the preferred pendulum stabilizer), it is necessary to summarize some of the numerous complications of gyroscopes and gyroscopic stabilizers.

First, and as is well known, there is the effect of precession which causes the gyro to react at right angles to the applied torque.

Second, a constant torque must be applied for a gyro to pan at a constant rate, the required torque being proportional to the angular rate. This means that gyro stabilized systems must consume relatively large amounts of power during panning.

Additionally, gyros have an often troublesome natural frequency of nutation which is a function of the amount of rotating inertia relative to the non-rotating inertia.

All of the above, in addition to the obvious further mechanical complexity due to motors, bearings, balanced rotors, and the like, indicates that the elimination of the gyro would greatly simplify the stabilization device.

Yet, it has been known in the prior art to impose non-linear first order restoring forces (only) on gyro controlled inertially referenced passive stabilizers. Schwem Technology Incorporated of Pleasant Hill, Calif., the assignee herein, currently produces a stabilized television camera lens sold under the trademark Gyrozoom FP-1 Image Stabilizing Zoom Lens for professional video cameras. See the patent referred to above Alvarex et al., U.S. Pat. No. 4,615,590 for the configuration of this instrument. (The referenced controller function is not disclosed in the referenced patent.) The non-linear restoring forces require as an attribute for their generation, displacement rom both gimbal axes for the generation of a restoring force at a single gimbal axis. No second order force is currently used with this device.

Also, an important attribute of the first order control only is that during steady panning a constant angle is opened up between the gyro and the case. In other words, the optical system remains off-axis, degrading image quality during panning as a result of the first order control. The gyro returns to center only after panning ceases.

SUMMARY OF THE INVENTION

A stabilizing controller system is disclosed for passive inertial stabilizers having case mounted optics moving in combination with inertially suspended optics to stabilize images against accidental angular motion. The controller system utilizes non-linear terms to resolve the conflict between weak coupling for good stabilization and strong coupling for good panning. The controller system, applicable to either the preferred pendulum type or to gyro stabilized systems, includes the use of both first and second order restoring forces. A relationship utilizing the damping ratio is disclosed between applicable first and second order controller function terms and their applicable constants to enable uniform controller system response. Examples of the controller function are applied to an inertial pendulum stabilizer and a gyroscope stabilizer. The inertial pendulum stabilizer is illustrated in a polar displacement and restoration embodiment and a preferred 2-axis displacement and restoration embodiment. Functions are set forth for noncoincidence of sensors and torque motors on the gimbal axes. There results a controller function imposed on the inertial stabilizer from the case which imparts substantially linear forces of correction for pendulum excursion adjacent the line of sight. Smooth non-linear and increasing forces are applied for movement outside of the linear range. Improved panning results.

For illustrative purposes in this disclosure the stabilizing element is a positive lens suspended in a two axis gimbal and in front of the optical train to be stabilized, with a complimenting negative lens element mounted to the case and in front of the suspended positive element. A sensor output gives suspended element radial motion relative to the case throughout the conical freedom mentioned above. The sensor does not apply any torques to the suspended element. A torque motor applies radial restoring torque to the suspended element for returning it to a neutral position with respect to the case.

A servo controller function circuit operating on the sensor input provides restoring torque signal to the torque motor. The restoring torque is varied non-linearly as a function of suspended element position and velocity relative to the case. Restoring torque is weak and linear in the region surrounding the neutral position of the suspended element (typically $< \pm 2$ degrees), thus minimally coupling the suspended element to the case in this region and providing good inertial stability. The restoring force is increased exponentially outside the stable region and as the suspended element approaches the mechanical limits of its travel relative to the case (typically $\pm 5$ degrees). This provides a smooth and continuously increasing coupling for the larger amounts of case motion which are encountered in panning and pointing the instrument. The continuously variable non-linear coupling provides for both good panning and good stabilization in the same operating mode.

Equations of motion for the coupling controller function are generated. Provision is made for linear and non-linear first-order restoring forces, linear and non-linear second order restoring forces, and linear and non-linear third order restoring forces. Non-linearization of the linear components is disclosed.

This invention provides a means to split the sensors and the torquers into two orthogonal axes each.

The two orthogonal sensor axes are preferably in the same plane as the gimbal axes but sensor and gimbal axes need not coincide. The only requirement is that the motion of the suspended element is sensed over its full conical freedom. Sensors are non-contact optical sensors and do not apply any torques to the suspended element.

The two orthogonal torque motor axes are also preferably in the plane of the gimbals but need not coincide with either sensor axes or gimbal axes.

A servo controller function circuit operating on the two orthogonal sensor inputs provides two outputs to the torque motors. Provision is made to compensate for the non-trivial superposition of the two non-linear axes. One obvious attribute is that superposition of the non-linear forces requires input from both sensor axes to generate output to a single torquer axis.

OTHER OBJECTS, FEATURES, ADVANTAGES

An object of this invention is to disclose a stabilizing protocol for coupling an inertial stabilizer to a case. Accordingly, coupling of an inertial stabilizer to a case is caused by both first and second order non-linear terms. For a gyroscope, these first and second order terms are displacement and integration terms respectively. For the preferred pendulum, these first and second order terms are velocity coupling and displacement coupling respectively. The first and second order terms are related by their respective constants. Specifically, by taking conditions of resonance and computing the damping ratio, the first and second order terms are related by their constants.

Another object of this invention is to provide for smooth and continuously variable non-linear coupling between the case and the inertially stabilizing optical element for greatly improved panning of the instrument without degradation of stabilization. This allows weak coupling (good inertial stability) in the region of small (typically $< \pm 2$ degrees) perturbations, combined with increasingly stronger coupling for the larger amounts of case motion which are encountered in panning and pointing the instrument.

An advantage of this controller is that it permits the continuously variable coupling to provide for both good panning and good stabilization in the same operating mode, eliminating the need, for example, of switching between two coupling modes: one stable, one panning.

Another feature of this invention is to provide a control method for pendulum type inertial stabilizers which produces panning performance equivalent to or better than that achieved using existing gyro based systems.

Another feature of this invention is to improve on the first order non-linear response by also incorporating second and higher order non-linear terms in the controller function.

Another object of this invention is to generate equations of motion for non-linear coupling as applied to inertial type stabilizers. An advantage of the disclosed equations for both linear and non-linear restoring forces is that, for the first time, non-linear second and higher order restoring forces are applied to an optical stabilizer. These non-linear higher order restoring forces have the easily recognized attribute that the restoring force generated at one axis is dependent upon displacement at both axes of the suspension. These equations include linear and non-linear first, second, and third order restoring forces.

Another advantage of this invention is that the equations of motion can be realized using electronic circuits. Placement of the discrete components in the circuit in an order serially suggested by the equations occurs, or alternatively the controller function can be implemented using a microprocessor.

A further advantage is that the response of the non-linear portions of the controller function can be altered. Specifically, and dependent upon the stabilizer used, the forces encountered at the limits of stabilizer movement can be adjusted.

A further object of this invention is to disclose the use of the controller functions in combination with the preferred pendulum type stabilizers. Two embodiments are disclosed.

In a first embodiment, a neutrally balanced pendulum stabilizer is provided with a torque apparatus that always applies a radial force of correction on the pendulum with respect to the line of sight. A sensor is disclosed which senses the magnitude only of the displacement of the pendulum from the line of sight. By the expedient of imposing a non-linear restoring force through the torque apparatus, stabilization results.

An advantage of this embodiment is that sensing the direction or vector of stabilizer movement is not required.

In a second and preferred embodiment, a neutrally balance pendulum stabilizer is gimbal mounted. Paired orthogonal sensors attached across the gimbals sense displacement. Paired orthogonal torque motors are utilized to generate restoring forces.

An advantage of this aspect of the invention is that the sensors are not required to be coaxial with the torque motors. Consequently, sensor location can be moved to locations dictated by the convenience of the design. Accordingly, a simple circuit is disclosed to accommodate off axis placement of the sensors with respect to the torque motors.

Controller circuitry is disclosed having the attribute that the input of displacement from both sensors is required for generation of the output at each torque motor.

A further advantage of the invention is that the torque motors can be preferably mounted to act on only one axis of the gimbal at a time. With such mounting, forces of restoration applied from the controller circuitry can be isolated into two components, one component being for one axis of the gimbal and the other component being for the remaining axis of the gimbal.

BRIEF EXPLANATION OF THE DRAWINGS

Other objects, features and advantages if this invention will become apparent after referring to the following specification and attached drawings in which:

FIG. 1A is a perspective view of the preferred embodiment of this invention illustrating a pendulum type inertial stabilizer suspended on gimbals with the stabilizer including first and second optical elements moving in opposition one to another to effect by their motion the deflection of collimated light; the stabilizer shown is partially cut away for purposes of understanding;

FIG. 1B is a section of FIG. 1A showing the stabilizing pendulum in the neutral position;

FIG. 2 is a view similar to FIG. 1B illustrating the camera lens undergoing excursion pursuant to accidental angular motion and the pendulum stabilizer effecting deflection of the collimated light entering the camera lens;

FIG. 3 is a schematic block diagram of the apparatus for the passive inertial stabilizers herein utilized, it being understood that the illustrated schematic is applicable to both gyro stabilized and pendulum stabilized optical elements;

FIG. 4 is a Bode plot of image motion attenuation in decibels compared to accidental angular motion for tremor frequency in hertz, the plot containing varying linear portions for varying first order constants;

FIG. 5 is a schematic illustrating the attachment of the pendulum to the case;

FIG. 6 is a plot of a gyro panning characteristic illustrating the rate of gyro panning versus the displacement between the case and gyro during the panning motion and illustrating at the bottom portion the substantially linear slope for linear restoration in zones of central vibration;

FIGS. 7A-7D are superimposed plots illustrating in FIG. 7A a theoretical pan rate, in FIG. 7B a response of a gyro; in FIG. 7C a first order coupling of a case to pendulum angle; and in FIG. 7D the combination of first order and second order coupling for a pendulum;

FIG. 8A is a sensor for detecting the magnitude of displacement without detecting the direction of the displacement;

FIG. 8B is an alternate apparatus for detecting the magnitude of displacement without detecting the direction of displacement;

FIG. 8C illustrates the circuit of FIG. 8A with the deflection sensing elements undergoing deflections;

FIG. 9A is a schematic of a torque motor for applying a radial force of restoration on a deflected pendulum to and towards the line of sight;

FIG. 9B is a free body diagram of the working portion of the torque motor of FIG. 9A illustrating the forces produced by the motor of FIG. 9A;

FIG. 10 is a circuit schematic of circuitry sufficient to provide both linear and non-linear restoring forces to a pendulum type stabilizer having the sensor of FIG. 8A or FIG. 8B and having the torque motor illustrated and described in FIGS. 9A and 9B;

FIG. 11 is a section across the gimbal axes of FIG. 1A illustrating displacement of the sensors from the torque motor axis;

FIG. 12A is a vector diagram illustrating the transform of the sensor referenced signal into the torquer referenced signal;

FIG. 12B is the transformation matrix circuit;

FIG. 13A is a view taken along the line of sight of the sensor utilized in FIG. 1A;

FIG. 13B is a view of the sensor taken perpendicular to the line of sight of FIG. 1A;

FIG. 14A is a side view taken perpendicular to the optical axis illustrating the torquer of FIG. 1A;

FIG. 14B is a front view taken down the optical axis of the torquer utilized in FIG. 1A;

FIG. 14C is a top view of the torque motors utilized in FIG. 1A;

FIG. 15A is a plot of the prior art illustrating the linear functions used by the prior art and the independence of the respective orthogonal restoring forces;

FIG. 15B illustrates the imposition of non-linear forces and the requirement of interdependence of sensed displacement with respect to the restoring force applied, the plot here showing that the paths of pendulum return are nonradial where displacement interdependence is not utilized;

FIG. 15C is a plot similar to FIG. 15B with the exception that the non-linear forces are now radially directed;

FIG. 16 is a schematic for a controller for the two axis configuration of the pendulum stabilizer of FIG. 1A; and, FIG. 17 is a circuit map of an actual circuit for the two axis stabilizer illustrated in FIG. 1A and set forth in block schematic in FIG. 16 with FIGS. 17A through 17D illustrating in detail the corresponding sections of the circuit illustrated in the circuit map.

PREFERRED EMBODIMENTS OF THE INVENTION

FIGS. 1A and 1B are respective perspective and section top plan views of a pendulum type stabilizer. The pendulum P is shown stabilizing a television camera C having an attached and protruding lens train 20. Typically, the entirety of the camera C and lens train 20 is surrounded by a case A. Case A attaches at clamp K to the camera C. This attachment occurs at the outside of the lens train 20. The camera is thus braced in the interior so that the optical axis 0 of the camera extends permanently along a central axis through the case.

It will be understood that in tracking objects sighted, case A is subjected to accidental angular motion. For example, if the camera is hand held or placed on a vibrating platform, such as that provided by a vehicle travelling on a rough road or in a vibrating aircraft such as a helicopter, numerous vibrations will be imposed upon the case A. It is the purpose of the pendulum stabilizer P to make sure that the image recorded by camera C is not unacceptably deflected by these accidental angular motions.

Referring to FIGS. 1B and 2 the action of the stabilizer at its optical elements to produce the stabilization of the incoming light can be understood.

Referring to FIG. 1B a negative lens L1 is illustrated. Lens L1 is typically fixed on the front of the lens train with respect to the camera C; it moves with camera C on the front of the lens train.

A second lens L2 is utilized. Lens L2 moves as pendulum P moves.

FIG. 2 shows the stabilization of the line of sight (LOS) during angular tilting of the case. The pendulum P, being inertially stable and decoupled from the case, has remained pointed in its original direction. The optical axis O of the camera lens and camera, however, has tilted upward in inertial space through an angle $\Theta_c$ due to accidental angular motion.

The ray travelling exactly down the optical axis of the camera lens now strikes the suspended positive lens L2 above its centerline and is correspondingly deflected downward slightly according to the wedge of the non-parallel surfaces on that path. In addition, the ray also strikes the case-mounted negative element L1 below its centerline and is further deflected downward due to the wedge along that path. The optical axis O has been tilted down by the angle $\Theta_{OPT}$ with respect to the case axis O. The ray R in object space has maintained its original orientation with respect to the LOS thus providing angular stabilization of the LOS. The geometry and positioning of the optics and the pivot point is chosen so that $\Theta_{OPT}$ is exactly equal to but opposite of $\Theta_c$.

To a first order approximation, the distance from the pivot point to the positive lens is nominally equal to the focal length of the positive lens.

This type of optical stabilization is called camera stabilization. The camera, even though it has been angularly displaced, receives its image in precisely the same way and same location as it did before displacement occurred.

Other types of stabilization other than camera stabilization are known. For example, view stabilization is used for viewing devices. Where binoculars are utilized, it is required that collimated light exiting the binocular be in the same direction as collimated light entering the binocular. Well known modifications of the deflecting power of lenses L1 and L2 can be made responsive to the overall instrument goods magnification to effect such view stabilization.

It will be understood that the following invention is applicable to both so-called camera stabilization and view stabilization as required in binoculars.

Returning to FIG. 1A it will be seen that suspension of pendulum P occurs at two gimbal axes 16, 18 by means of gimbal 40. Gimbal 40 extends to pendulum P in a position where pendulum P is neutrally balanced with respect to camera C. That is to say, pendulum P at its forward end including the mass of lens L2 has a moment equal to the pendulum P at its trailing end and about camera C including the countermass W mounted at the end of the pendulum.

As is well known, each of the gimbal axes 16 and 18 are the axes about which displacement of the pendulum occurs.

The pendulum is suspended for mechanical freedom of conical volume with respect to the case. This conical volume traced on a plane normal to its central axis would describe a circle. For example, see FIGS. 15A-15C for illustration of plots of excursion in mechanical freedom of conical shape.

For this disclosure to be operable, displacement of the pendulum relative to the case must be at first measured.

Accordingly, a variable density optical film 42 is mounted to the pendulum. Film 42 has a variable density. As the gimbals are displaced at axes 16, 18, film 42 undergoes arcuate movement. Displacement is read by a light emitting diode (LED) and a photosensor hereinafter discussed.

A restoring torque needs to be applied to the displaced axis in accordance with the teachings of this invention. Referring to FIG. 1A pendulum P includes four motors M. Motors M are here shown as electromagnets. These electromagnets exert torques on the pendulum. These torques cause axes 16, 18 to return to and toward a neutral position dependent upon the torques applied.

Although the preferred embodiment uses an inertial pendulum as opposed to a gyro, it should be remembered that this invention can also be applied to gyro stabilizers by only slight modification of the equations. In fact the gyro system provides a convenient starting point for the derivation of the equations.

It is an attribute of inertial stabilizers that the apparent image motion is exactly proportional to the movement of the inertially suspended element. Thus, for perfect stability complete decoupling of the case from the suspended element is required.

However, for passive inertial stabilizers to be useful, some coupling must be provided between the case and the suspended optical element. This enables the passive inertial stabilizer to be able to pan and point and to maintain the centering of the suspended element relative to the case under real life "drift" conditions.

FIG. 3 shows a general servo block diagram for describing the coupling of the inertially suspended element E to the case. In the absence of more complex stabilizing schemes, typically the angle $\Delta\Theta$ between the case and the inertial element is measured at sensor S and restoring force applied based on this difference. Torque is applied using a torque motor M which is specifically designed to output torque proportional to an input signal. Generally the torque output can be made to be proportional to the current in the motor, and so a current driver D is used to provide current proportional to the input signal from the controller. In addition, the torquer is ideally designed so that its torque output is independent of angle $\Delta\Theta$.

The inertially suspended element E is typically a gyro or a pendulum. It responds to the applied torques according to well known laws of physics.

For the case of a gyro stabilized element, the reader is referred to Alvarez et al. U.S. Pat. No. 4,615,590 as illustrative of such a device.

In analyzing the performance of the coupling, it is remembered that the motion of the image $\Theta_{IMAGE}$ is directly proportional to the motion of the suspended element in inertial space. The transfer function of interest is simply the transfer function between the case and the suspended element. Of course the controller function F is the essence of the coupling. It is here that the essence of this disclosure is concentrated.

The performance of the stabilization is directly related to the amount of coupling from the case to the suspended element. The weaker the coupling, the better the stabilization. It will be instructive to examine first the coupling in the stable region especially as related to the required stabilization specification.

Referring to FIG. 4 which shows the frequency response for first order coupling, it is seen that the stabilization (image motion attenuation) improves with increasing frequency according to a first order low pass filter transfer function. The transfer function for generating the response as shown in FIG. 4 for both pendulum and gyro systems can be derived as follows, where the subscript P will refer to pendulums and the subscript G will refer to gyros:

Well known equation of motion:
Gyro [1a]
$$\Sigma T = I_R \omega \dot{\Theta}_G$$

Pendulum [1b]
$$\Sigma T = I \ddot{\Theta}_P$$

where T=applied torque, $I_r$=rotor inertia, $\omega$=rotor speed, $\Theta_G$=angular rate (rad/sec) of gyro in inertial space, I=pendulum inertia, and $\Theta_P$=acceleration (rad/sec$^2$) of pendulum in inertial space.

Assume a controller function:
Gyro [2a]
$$T = I_R \omega k_f^* \Delta\Theta_G$$

Pendulum [2b]
$$T = I k_f^* \Delta\Theta_P$$

where $\Delta\Theta_G = \Theta_C - \Theta_G$, $\Delta\Theta_P = \Theta_c - \Theta_P$, and $K_f^*$ is a first order coupling constant.

then:
Gyro [3a]
$$\frac{T}{I_R\omega} = \dot{\Theta}_G = k_f^* (\Theta_C - \Theta_G)$$

Pendulum [3b]
$$\frac{T}{I} = \ddot{\Theta}_P = k_f^* (\dot{\Theta}_C - \dot{\Theta}_P)$$

taking the

Laplace transform:
Gyro [4]
$$s\Theta_G = k_f^* (\Theta_C - \Theta_G)$$
or:
Pendulum
$$s^2\Theta_P = k_f^* s(\Theta_C - \Theta_P)$$
$$s\Theta_P = k_f^*(\Theta_C - \Theta_P)$$

Laplace transfer function:
Gyro [5]
$$\frac{\Theta_G}{\Theta_C} = \frac{1}{\frac{s}{k_f^*} + 1}$$

Pendulum
$$\frac{\Theta_P}{\Theta_C} = \frac{1}{\frac{s}{k_f^*} + 1}$$

and substituting $s=j\omega=j2\pi f$ and solving for M, the magnification ratio, we find the resulting functions are identical:

Gyro [6]
$$\left| M = \frac{1}{\sqrt{\left(\frac{2\pi f}{k_f^*}\right)^2 + 1}} \right|$$

Pendulum
$$M = \frac{1}{\sqrt{\left(\frac{2\pi f}{k_f^*}\right)^2 + 1}}$$

where f is the tremor frequency in Hz.

Thus it is seen that the controller functions assumed at [2a] and [2b] yield exactly the same response as shown on the Bode plot, FIG. 4. Both controller functions can be seen to be first order by inspection of the equations at [3a], [3b], and [5].

The importance of the coupling coefficient $k_f^*$ is seen in the family of curves. It is apparent that in order to achieve a certain stabilization specification, a certain value of $k_f^*$ must be achieved independent of the other parameters in the system. Thus, once the stabilization requirement has been specified, the required value of the first order coupling coefficient $k^{f*}$ is fixed. Later it will be shown that $k_f^*$ can be used to derive the controller function parameters for the higher order terms.

Having set forth some fundamentals for analyzing the performance as related to the coupling, a more general analysis can be shown for including the higher order linear terms as applied to inertial pendulum type stabilizers.

The following explanation will show the application of linear servo control theory to the coupling of pendulum type stabilizers. (This can also be found somewhat in the prior art Humphrey U.S. Pat. No. 3,756,686.) The purpose of this explanation is to form a convenient basis for the subsequent application of the non-linear servo.

Referring to FIG. 5 and writing the equation of motion for a system of that type, we get:

$$\Sigma T = I\ddot{\Theta}_P = c(\dot{\Theta}_C - \dot{\Theta}_P) + K(\dot{\Theta}_C - \dot{\Theta}_P) \quad (7)$$

where k and c are the linear spring and damping constants respectively.

More generally and for electronic servo control of a pendulum system including integral control, we can write:

$$\Sigma T = I\ddot{\Theta}_P = k_f \Delta\dot{\Theta} + k_S \Delta\Theta + k_I \int \Delta\Theta dt \quad (8)$$

where $\Delta\Theta = \Theta_C - \Theta_P$, and $k_I$ is an integration constant.

From the well known definition of the damping ratio $\xi$ for second order linear systems, we can write:

$$\xi = \frac{c}{c_{CRITICAL}} = \frac{k_f}{2\sqrt{k_S I}} \quad [9]$$

and rearranging:

$$k_s = \frac{k_f^2}{4I\xi^2} \quad [10]$$

but, by inspection of equation [3b] it is apparent that $$k_f = Ik_f^* \text{ so:}$$

$$k_s = \frac{(Ik_f^*)^2}{4I\xi^2} = \frac{I(k_f^*)^2}{4\xi^2} \quad [11]$$

We now have an explicit equation for determining $k_S$ as a function of I, $k_f^*$, and $\xi$.

Addressing the integral term of equation [8], and having a rule of thumb for the estimation of $k_I$:

$$k_I = \frac{Q k_S k_f}{I} \quad [12]$$

where Q is a constant to be determined empirically. Then substituting for $k_S$ and $k_f$:

$$k_I = \frac{QI(k_f^*)^2 I k_f^*}{I 4\xi^2} = \frac{QI(k_f^*)^3}{4\xi^2} \qquad [13]$$

which is an explicit equation for the parameter $k_I$ based on the one additional factor Q.

We can now write the solution for the linear pendulum controller function for the weakly coupled stable region:

$$T = (Ik_f^*)\Delta\dot{\Theta} + \left(\frac{I(k_f^*)^2}{4\xi^2}\right)\Delta\Theta + \left(\frac{QI(k_f^*)^3}{4\xi^2}\right)\int\Delta\Theta dt \qquad [14]$$

Thus, assuming that I is given, the first order coupling coefficient $k_f$ is determined explicitly by $k_f^*$ from the stabilization specification. Then the only remaining variable governing $k_S$ is the damping ratio $\xi$. Likewise the only remaining variable governing $k_I$ is Q.

The major advantage of this analysis is that now the controller function linear gains ($k_f$, $k_S$, and $k_I$) can be set and tuned based on desired system characteristics, such as stabilization ($k_f^*$) or damping ($\xi$). For example, increasing $k_f^*$ by 25 percent requires first order gain $k_f$ be increased by 25 percent, second order gain $k_S$ must be increased by $(1.25)^2$ or 56 percent, while $k_I$ must be increased by $(1.25)^3$ or 95 percent to maintain the same relative system characteristics. Other things are also apparent; for example, the required torque is directly proportional to the pendulum inertia.

By inspection of equation [8] the meaning of first, second, and third order coupling can be seen. The left hand side of equation [8] is acceleration $\ddot{\Theta}_P$. The first term on the right hand side of [8] is proportional to velocity $\Delta\dot{\Theta}$ and is one order removed from the acceleration on the left hand side. Thus this term is called first order. The second term on the right hand side of [8] is proportional to position $\Delta\Theta$ and is two orders removed from the acceleration on the left hand side, so it is called second order coupling. Likewise the last term on the right hand side of [8] is proportional to the integral of position, another order removed, so it is called third order coupling.

The above derivation of the linear controller function for the stable region shows how all of the coupling terms are fundamentally limited to small values based on the stabilization specification ($k_f^*$) Unfortunately these values do not provide sufficient coupling for adequately rapid panning under normal conditions. The maximum pan rate achievable with this weak linear coupling alone is limited to the range of only a few degrees per second up to maybe 5 degrees per second without unacceptable compromise of the stabilization.

This disclosure overcomes this problem by incorporating a non-linearity in the circuit for rapid panning outside the stable region. The non-linearity for panning is based on the two conflicting requirements of weak coupling for good stabilization versus strong coupling for good panning.

Non-linear first order coupling has been applied to a gyro stabilized system, (Gyrozoom FP-1 Image Stabilizing Zoom Lens a product of Schwem Technology of Pleasant Hills, Calif.). This prior art is a good starting point for deriving and illustrating the improvements of this invention.

The equation governing the response of the gyro to external torques [1a] is well known. Given that gyro pan rate is directly proportional to applied torque and referring to FIG. 6, we can write the following equation as an extension of equation [3a]:

$$\frac{57.3 T}{I_R \omega} = \dot{\phi}_G = k_f^* \Delta\phi + k_p^* \Delta\phi^n \qquad [15]$$

where n is an exponent and $k_p^*$ is a non-linear coupling constant, and where $\phi$ is in degrees for convenience as opposed to $\Theta$ in radians. This equation adds a specific non-linear term to the existing first order linear equation of [3a] and is plotted in FIG. 6. The equation is still first order (now non-linear):

$$\frac{57.3 T}{I_R \omega} = \dot{\phi}_G = (k_f^* + k_p^* \Delta\phi^{n-1})\Delta\phi \qquad [16]$$

It is important for the reader to realize that this is only one type of non-linearity to add and there are many others. This invention is not intended to be limited by the actual equation for the panning characteristic. Many types of panning characteristics are possible.

This disclosure has emphasis in making the higher order terms "match" the first order term, regardless of the non-linearity used to generate the first order term. The gyro controller function is:

$$T = \frac{I_R \omega}{57.3} (k_f^* + k_p^* \Delta\phi^{n-1})\Delta\phi \qquad [17]$$

or more properly converting to radians: $\Delta\Theta = 57.3\Delta\Theta$ $$T = I_R \omega (k_f^* + k_p^* (57.3)^{n-n} \Delta\Theta^{n-1})\Delta\Theta \qquad (18)$$

The response of the system in the central linear region where $k_f$ is dominant is still the same as [5] and FIG. 4, maintaining the same stabilization performance. However, outside this central region the applied torque increases rapidly but smoothly to a value which allows for fast panning of the instrument.

One attribute of this first order response is that the angle opened up $\Delta\Theta$ is a constant function of the pan rate and can be read off the curve of FIG. 6.

The stabilizing action of a gyro stabilizer can be understood with respect to FIGS. 7A and 7B. FIG. 7B shows the response of this system to the constant pan rate input of FIG. 7A. The constant angle opened up for a constant pan rate is readily apparent. During panning at a constant rate, the constant $\Delta\Theta$ causes a noticeable degradation of the image due to the off-axis condition. This off axis condition is not relieved until panning ceases and the gyro returns to center. As will hereinafter be set forth, one aspect of this invention is to alleviate this problem by adding a non-linear second order term.

There are two more points to be made about the Gyro Panning Characteristic, FIG. 6. The first is that it was derived based on the considerations required for panning as opposed to stabilizing. A smooth and continuous transition between stabilizing to fast panning is desired. The second and more important point is that this type of curve, represented by equation [15], can be used as a starting point. The curve can be used as a specification to define the panning characteristic of systems with higher order non-linear terms. This is similar to the way $k_f^*$ alone is used to describe the coupling characteristic in the stable region of the linear system which includes higher order terms dependent on $k_f$.

Having defined a starting point for a non-linear servo controller as applied to a gyro system, an equivalent system for application to pendulum stabilizers will now be derived. Starting from [18] and [1a]:

$$\text{then } \dot{\Theta}_G = (k_f^* + k_P^*(57.3)^{n-1}\Delta\Theta^{n-1})\Delta\Theta \quad (19)$$

$$\text{or } \dot{\Theta}_G = k_f^*\Delta\Theta + k_P^*(57.3)^{n-1}\Delta\Theta^n \quad (20)$$

Now we want by definition the angle of the pendulum to be equal to the angle of the gyro. This is expressed mathematically and leads to the following conclusions (also expressed mathematically).

$$\Theta_P = \Theta_G \rightarrow \dot{\Theta}_P = \dot{\Theta}_G \rightarrow \ddot{\Theta}_P = \ddot{\Theta}_G \text{ (same response)}$$

$$\text{so } \dot{\Theta}_G = \dot{\Theta}_P = k_f^*\Delta\Theta + k_P^*(57.3)^{n-1}\Delta\Theta^n$$

Differentiating:
$$\ddot{\Theta}_P = k_f^*\Delta\dot{\Theta} k_P^* n(57.3)^{n-1}\Delta\Theta^{n-1}\Delta\dot{\Theta} \quad (21)$$

But
$$T = I\ddot{\Theta}_P \text{ for pendulum}$$
so:
$$T = Ik_f^*\Delta\dot{\Theta} + Ik_P^* n(57.3)^{n-1}\Delta\Theta^{n-1}\Delta\dot{\Theta} \quad [22]$$
or:
$$T = I(k_f^* + k_P^* n(57.3)^{n-1}\Delta\Theta^{n-1})\Delta\dot{\Theta}. \quad [23]$$

So the non-linear equivalent controller function for a pendulum is:

$$T = (k_f + k_P\Delta\Theta^{n-1})\Delta\dot{\Theta} \quad (24)$$

where: $k_f = Ik_f^*$ and $k_P = Ik_P^* n(57.3)^{n-1}$, and $k_f^*$, $k_P^*$ and n describe the gyro panning characteristic according to [15] and FIG. 6.

Equation [24] is the equivalent controller function for the pendulum which will give the same response as the gyro system using equation [18]. The response of this equivalent pendulum system is shown in FIG. 7C which is seen to be the same as the gyro response in FIG. 7B. This equivalent pendulum system is also a first order system as evidenced by the response of FIG. 7C and by inspection of equation [24].

With regard to [24] the equivalent controller function for the pendulum, and noting that it requires the rate signal $\Delta\dot{\Theta}$ as opposed to the angle signal $\Delta\Theta$ which is required for the gyro controller, there are two ways to achieve this signal. One is to use a sensor which gives a rate output instead of a position output. The other way is to use a position signal from the sensor but differentiate it electronically before processing in the controller function. Electronic differentiation of signals to achieve their rate of change is well known.

So in summary, when the desired panning characteristic of a first order non-linear system is described according to equation [15], then the controller function for a pendulum is [24], the controller function for a gyro is [18], and the panning response of both systems appears as shown in FIG. 7B and 7C.

Also, higher order linear coupling terms as applied to pendulum type stabilizers have been shown in equation [8], and a method for explicitly determining the coefficient values based on system parameters has been given in [14]. It is obvious that the addition of the higher order linear terms improves the performance of the system in addition to significantly changing the character of the response.

One aspect of this invention is to provide for the non-linearization of the remaining higher order terms in order to further improve the panning characteristic. A method will also be shown for the explicit determination of the non-linear coefficients similar to the method to determine the linear coefficients in equation [14] including "matching" the higher order non-linear terms to the first order non-linear term.

The following will show the addition of the non-linear higher order terms to the preferred embodiment pendulum type stabilizer. The linear coefficient values for controller function [14] are related according to equations [10] and [12] where $k_f = Ik_f^*$ in [8]. Looking at first order controller function [24] there is seen a linear part, $k_f$, and a non-linear part, $k_P\Delta\Theta^{n-1}$.

A general non-linear controller function including higher order terms may therefore take the form:

$$T = (k_f + k_P\Delta\dot{\Theta}^{n-1})\Delta\Theta + (k_S + F_2)\Delta\Theta + (k_I + F_3)\int\Delta\Theta dt \quad (25)$$

where $F_2$ is a non-linear second order coupling term and $F_3$ is a non-linear third order coupling term. It is then proposed to derive the non-linear coupling terms, $F_2$ and $F_3$, in a manner similar to the derivation of [14] via [10] and [12]. Thus:

$$F_2 = \frac{(k_P\Delta\Theta^{n-1})^2}{4I\xi^2} = \frac{k_P^2\Delta\Theta^{2(n-1)}}{4I\xi^2} \text{ (similar to [10])} \quad [26]$$

or, since $k_P = Ik_P^* n(57.3)^{n-1}$ then:

$$F_2 = \frac{fI(k_P^* n(57.3)^{n-1})^2}{4\xi^2}\Delta\Theta^m = k_{SP}\Delta\Theta^m \quad [27]$$

Where $m = 2(n-1)$, where $k_{SP}$ is a constant second order coefficient and where F is an empirical factor used for fine tuning the response.

Then also for $F_3$:

$$F_3 = \frac{P}{I}\left(\frac{(k_P\Delta\Theta^{n-1})^2}{4I\xi^2}\right)(k_P\Delta\Theta^{n-1}) \text{ (similar to [12])} \quad [28]$$

or, $$F_3 = \frac{PI(k_P^* n(57.3)^{n-1})^3}{4\xi^2}\Delta\Theta^q = k_{IP}\Delta\Theta^q \quad [29]$$

Where $q = 3(n-1)$, $k_{IP}$ is a constant third order coefficient, and where P is a constant to be determined empirically.

Thus the general non-linear controller function for a pendulum stabilizer is:

$$T = (k_f + k_P\Delta\dot{\Theta}^{n-1})\Delta\Theta + (k_S + k_{SP}\Delta\Theta^m)\Delta\Theta + (k_I + k_{IP}\Delta\Theta^q)\int\Delta\Theta dt \quad (30)$$

where:

1st Order $\quad k_f = Ik_f^*$ $\quad\quad\quad\quad\quad k_p = Ik_p^* n(57.3)^{n-1}$ -continued 2nd Order  $k_S = \dfrac{I(k_f^*)^2}{4\xi^2}$ $k_{SP} = \dfrac{fI(k_p^* n(57.3)^{n-1})^2}{4\xi^2}$ 3rd Order  $k_I = \dfrac{QI(k_f^*)^3}{4\xi^2}$ $k_{IP} = \dfrac{PI(k_p^* n(57.3)^{n-1})^3}{4\xi^2}$ and $m = 2(n-1)$ nominally, and $q = 3(n-1)$ nominally.

The improvement in the performance and panning characteristic is immediately obvious upon referring to FIG. 7D which is the time response for the higher order controller function [30]. (The integrator terms have been temporarily neglected for simplicity). The addition of second order coupling creates some definite advantages.

First, during a period of constant panning as shown in FIG. 7A, the stabilizer spends much less time off axis and quickly returns to center where the optical quality is usually much better. Second and less obvious, an attribute of the second order control is that the maximum pan rate achievable is now limited only by the angular acceleration, as opposed to the angular rate which is the limiting factor for the first order system.

The damping ratio adjustment of the second order non-linear gain, $k_{SP}$, is illustrated in FIG. 7D. There is one value which gives the optimum system response for a given $k_P^*$. Too much non-linear second order gain and the system is underdamped; it has excessive overshoot or even oscillation. Not enough non-linear second order gain and the system is overdamped; it does not return to center as quickly as it could. The optimum damping ratio adjustment gives response as shown that returns to center as quickly as possible with a minimum amount of overshoot. See equations [9], [10] and [26], [27].

There are a few points to observe about equation [30] itself.

First, each of the coefficients in [30] is given as an explicit function of the various system parameters, allowing tuning of the controller function according to these observable parameters. The effect of varying a certain parameter can be seen.

Second, the values of the higher order coefficients are dictated largely as a function of the first order coefficients which are directly determined from the panning characteristic equation [15] shown in FIG. 6. This ensures continued "matching" of the higher order terms to the first order terms over the entire range of operation and variation of system parameters. For example, the second order non-linear term has been derived so that the system damping coefficient remains approximately constant over the full range of pendulum travel. Without the second order non-linear term present the system damping coefficient would go from perhaps critically damped in the linear stable region to extremely over-damped in the non-linear region, causing a wide variation in the coupling characteristic depending on angular position.

Third, each controller function parameter is established based on only one independent determining factor. Assuming that the pendulum inertia, I, and the characteristic exponent of the non-linearity, n, are given, the controller function parameters have the following independent determinants:

| controller function parameter | major determinant | from |
|---|---|---|
| $k_f$ | $k_f^*$ | stabilization specification |
| $k_p$ | $k_p^*$ | panning specification (See FIG. 6) |
| $k_S$ | $\xi$ | stable region damping |
| $k_{SP}$ | $f$ | non-linear region damping |
| $k_I$ | $Q$ | linear integrator gain |
| $k_{IP}$ | $P$ | non-linear integrator gain |

Additionally, the expressions given for $m = 2(n-1)$ and $q = 3(n-1)$ are nominal and may be varied slightly from the exact values for further optimization.

In actual practice, the requirement of the addition of the non-linear third order integrator term, $k_{IP}$, is questionable. The main advantage of the integrator is to eliminate steady state drift in the system which is not directly related to panning and can usually be controlled by using only a linear integrator term. Subsequently, the non-linear integrator term, $F_3$ in equation [25] will be ignored further although its treatment is basically the same as $F_2$, the non-linear second order term.

Controller function equation [32] applies to a pendulum type inertial stabilizer which responds according to equation [b]. It is possible to derive the equivalent improved controller function for a gyro system. Forgoing the details of the derivation only the result is presented. The equation for an improved gyro controller which has the same response as the improved pendulum system is:

$$T_{GYRO} = (d_1 + k_2 \Delta\Theta^{n-1})\Delta\Theta + (k_3 + k_4 \Delta\Theta^m)\int \Delta\Theta dt + (k_5 k_6 \Delta\Theta^q)\int\int \Delta\Theta dt \quad (31)$$

Comparison of [31] with [30] shows the obvious similarity.

The supplementation of the electronic servo by mechanical methods should be considered. Although it is likely much more difficult to control the non-linearity of a mechanical element, one could be added in the limited region near the mechanical stops to soften the impact of hitting the mechanical stops when the electronic servo is exceeded. Stop 50 in FIG. 1B is a viscous rubber ring attached to the case for this purpose and provides a soft mechanical stop. With proper material selection and a cleverly designed cross-section of the ring, the extreme non-linearity of hitting a hard mechanical stop may be blended smoothly with the electronic servo to provide forgiving coupling even for the most violent amounts of case motion.

Up to this point the discussion has centered primarily on the servo theory of the invention as applied to a general class of inertial stabilizers. The prior art has been reviewed and used as a basis for development and illustration of the aspects of this invention. New equations for a general class of servo controller have been disclosed. The equations up to this point have been derived for a single arbitrary servo axis represented by $\Delta\Theta$.

The further discussion will relate to the application of the invention to two specific embodiments.

The first embodiment is the application of the invention in its simplest form to a pendulum servo stabilizer which operates in what will be called polar configuration.

The previous derivations of the controller function equations, using $\Delta\Theta$, have assumed that the applied torque has been oriented for motion along the same axis as the sensor axis used to control said applied torque. In the first embodiment, the suspended element is mounted for two degrees of freedom with respect to the LOS. Case motion can be in any azimuth direction. The elegant way to deal with the variable azimuth angle is to design a sensor which senses radial motion independent of azimuth and combine that with a radial torquer that always applies radial restoring torque independent of azimuth and along the same axis as the instantaneous sensor axis. The $\Delta\Theta$ signal will always be independent of azimuth and therefore a single channel servo can be used to control the motion of both axes simultaneously. We refer to such a system as a polar system.

An example of a sensor that senses radial motion independent of azimuth is shown in FIGS. 8A an 8C. A schematic pendulum stabilizer P is shown mounted on a two-axis gimbal G. The pendulum axis should be parallel to the LOS 0. There are two metal discs 50,52 separated by a thin air gap d. Disc 50 is mounted to the case. Disc 52 is mounted to the pendulum. Both disc 50, 52 are normal to the LOS and electrically insulated at their mounts. It is preferred that the discs be segments of spheres.

The two discs form a capacitor whose capacitance is determined by circuit means according to the equation $C = \epsilon A/d$, where $\epsilon$ is the dielectric constant of the air gap, A is the area of disc overlap, and d is the gap thickness. When the discs are round and the same diameter it can be shown that for small angles the change in capacitance is linearly proportional to displacement, thus providing the output of $\Delta\Theta$ independent of azimuth.

Referring to FIG. 8B, two metal rings 70, 71—which conceivably can be part of a gimbal—are shown. These rings are insulated and like the discs 50, 52 of FIG. 8A also form a capacitive sensor independent of azimuth.

An example of a polar torquer which always provides radial torque is shown in FIGS. 9A and 9B. The pendulum P is similar to FIG. 8A except there is axially mounted a magnet 80 to the pendulum, and a coil 81 to the case. Current in the coil causes a proportional attractive force F in an axial direction between the magnet and the coil. The attractive force F generates a torque on the pendulum according to $T = LF\sin\Delta\Theta$ where L is the lever arm. Approximating for small angles, we see that the applied torque is proportional to both the current in the coil, i, and $\Delta\Theta$. It is straight forward to compensate for this effect using a simple circuit between the controller and the current amplifier.

A block diagram of the application of the pendulum controller function [30]to a polar system is shown in FIG. 10. The blocks are self explanatory: The PWR is an analog exponent function, the MUL an analog multiplier, triangles are either summing junctions or linear gains. The torquer compensation is an analog divider.

An actual circuit for this embodiment will not be provided. An actual circuit deriving many of the same functions is provided for the more complicated embodiment of the stabilizer of FIG. 1A in FIG. 17. Given this circuit, those skilled in the art may easily derive such a circuit.

FIG. 1A shows the mechanical configuration of the preferred embodiment.

Pendulum P of FIG. 1A is mounted for 2 degree of freedom conical motion. There are two orthogonal sensor axes for sensing $\Delta\Theta$ at two decoupled points on the gimbals. In the following analyses these two orthogonal sensor axes will be referred to as $\alpha$ and $\beta$ respectively. The two controller function channels are referenced to the two sensor axes.

There are two orthogonal torquer axes for torquing the pendulum. In the preferred embodiment the torquer axes are not aligned with the sensor axes. This is done in the interest of saving space by distributing the components around the periphery of the gimbal. A compensation matrix is used to rotate the two-controller output torque vectors which are sensor referenced to coincide with the torquer axes. Sensors and torquers are in the plane of the gimbal axes, but none of sensor axes, torquer axes, or gimbal axes are aligned.

FIG. 11 shows the disposition of the sensor and the torquer axes, separated by angle $\gamma$, and the gimbal axes aligned with neither.

The separation of $\gamma$ between the sensor and torquer axes can be compensated by introducing a matrix network before the torquers and after the controller which is sensor referenced. The compensation matrix can be understood by referring to FIG. 12B which shows a block diagram of the compensation network and FIG. 12A, the vector diagram used for the derivation. The matrix equations are written by inspection from the vector diagram using $\overline{T}$ as an arbitrary torque vector and equating the compensated torque vector with the controller function output torque vector. The compensation is valid for any value of $\gamma$.

FIGS. 13A and 13B show one of the sensor axes of the preferred embodiment. A light path is established between LED 91 and photosensor 92 both fixed to the case 98. The gimbal portion 94 has mounted a variable density filter 93 in the light path. The sensing area on the variable density filter is located in the plane of the gimbals and traverses the light path. This mechanically decouples $\alpha$ axis motion 99 from $\beta$ axis motion 100 of the gimbals. The sensor is sensitive in one axis 99 but insensitive in the other axis 100.

Each sensor axis 96, 97 actually has a pair of diametrically opposite sensors operating in differential mode.

FIG. 14A-14C shows one of the torque motors M of the preferred embodiment. As in the case of the sensor, each axis is basically two voice coil actuators operating in differential mode. In this type of torque apparatus, torque output is proportional to current in the coil 112. Torque coils are driven with a current amplifier.

A magnet and pole piece 114 are fixed to gimbal. Relative movement of the magnet and pole piece 114 to the coil 112 accompanies the production of the desired torque. Magnetic flux lines are radial of the coil. (See FIG. 14B.) The coil 112 is mounted to the case. The center of coil 112 is located nominally in the plane of the gimbals for two reasons. First, mechanical decoupling of applied torques from the other torque motor axes occurs. Second, a more efficient motor design results.

The usage of two orthogonal non-linear servo axes in the preferred embodiment introduces a very important consideration which must be addressed for successful operation of the servo. In the prior art two orthogonal linear servo axes could be treated totally independently and superimposed without compensation according to the principle of linear superposition. However he addition of non-linear components to both servo axes in the preferred embodiment means that they can no longer be superimposed simply as the linear system could.

FIG. 15A shows on the lower part a simplified linear controller function $T_x = kx$. On the upper part of 15A is a quadrant of superimposed motion where the horizontal axis uses the controller function $T_x$ and the vertical axis uses the controller function $T_y$. The result of the superposition is seen. The response of the system is the same for any azimuth of motion. If the system is displaced to any position the returning trajectory 70 is always radial. Notice also the gradient lines which are perpendicular to the radial trajectories and so are therefore all circular. This is the result of superimposing two linear axes.

FIG. 15B shows the same type of plot for a superimposed but uncompensated non-linear system. The controller function plotted in the lower part is a simplified exponential $T_x = kx^n$. The upper part of 15B shows a quadrant of motion for the two superimposed non-linear axes. The trajectories are obviously not all radial. This means that the system will not return straight to the center when displaced. This effect is unacceptable for pointing the instrument in an arbitrary azimuth angle and this is the effect of superimposing two non-linear axes without compensation. As can be understood, compensation is required for the desired superposition.

FIG. 15C shows the method to compensate for that particular non-linear function. Notice that the horizontal axis controller function plotted in the lower part gives the same result as in FIG. 15B. However by introducing the cross-coupling between the x and y axes, the non-linear axes can be superimposed to yield fully radial trajectories from anywhere in the range of motion. This is the desired effect of the compensation which gives the same response in any azimuth direction for panning the instrument.

This compensation scheme must be applied to both of the controller axes for the two-axis non-linear system of the preferred embodiment. The two channels for the non-linear controller become:

$$T_\alpha = (k_f + k_p(\alpha^2 + \beta^2)^{n-1/2})\dot\alpha + (k_X + k_{SP} \cdot (\alpha^2 + \beta^2)^{m/2})\alpha + k_I \int \alpha \, dt \quad (32)$$

and $$T_\beta = (k_f + k_p(\alpha^2 + \beta^2)^{n-1/2})\dot\beta + (k_S + k_{SP} \cdot (\alpha^2 + \beta^2)^{m/2})\beta + k_I \int \beta \, dt \quad (33)$$

where $\alpha, \beta$ are the two orthogonal sensor outputs $T_\alpha, T_\beta$ are proportional to the applied torques in $\alpha, \beta$ axes respectively.

and where the coefficients are the same as those for equation [30].

It is an attribute of the non-linear compensation that both sensor inputs are used to determine the torquer output of a single axis.

Referring to FIG. 16 outputs from the sensor illustrated are input to the circuit. The $\alpha$ axis signal inputs at 200. The $\beta$ axis signal inputs at 202.

It is necessary to determine angular velocity. Accordingly by taking the first derivative 204, 206 of the terms $\alpha$ and $\beta$, angular velocity can be determined.

According to the non-linear compensation scheme, including inputs from both axes, it is necessary that displacements first be squared at squaring circuits 208, 210 and summed at a summing circuit 212.

The output of 212 is utilized in both the first and second order terms. Taking the case of the first order terms, 212 output is raised to an exponent at circuit 214. Thereafter, the respective constant $k_P$ is multiplied at circuit 215 and summed with constant $k_f$ at 216. These respective signals are summed at 217.

Regarding the second order term, the power is taken at circuit 224, and the constant $k_{SP}$ multiplied at 225. Thereafter, the second constant $k_S$ is generated at 226 and summed at 227.

Since the terms for the $\alpha$ and $\beta$ torques are analogous, only the $\alpha$ terms will be discussed. Since these treatments are in the logic order of the disclosed equations, the discussion will be brief.

The integral term is generated at circuit 230 and multiplied by the constant $k_I$ at 232.

The velocity term takes the output of summer 217 and differential circuit 204 and multiplies at 234.

Finally, the displacement term takes the output of summer 227 and multiplies at 236. Summing for the total torque output occurs at 240.

Having set forth the schematic, actual circuit components can now be set forth. These circuits will first be set forth with respect to the torque generated on the $\alpha$ axis. The torque generated on the $\beta$ axis will not be discussed as the reader will understand that it is precisely analogous.

$\alpha$ and $\beta$ input with respect to terminal 301 and 302. These respective signals are fed into squaring circuits 304, 306 and output to a summing junction, which divides the signal by a factor of two. The signal is boosted by a factor of two at amplifier 312 to output $\alpha^2$ plus $\beta^2$. This signal is then split into two branches. One branch is used for the damping term and the other branch is used for the spring term.

Considering the case of the damping term, output occurs to a power circuit 214 which raises $\alpha^2$ plus $\beta^2$ to the 1.67 power. Output occurs on line 318 which goes to an attenuator formed by resistors 302, 322 to impose the constant $k_P$ on the circuit. An amplifier 324 receives the signal and outputs the non-linear damping constant function. It is to be noted that the linear damping term (which is directly proportional to $k_f$) is an offset adjustable at pot 226 and is output through amplifier 324.

The output of amplifier 324 is a common term which is multiplied by the first derivative from inputs 340, 342 produced by conventional circuitry (not shown). This occurs at power circuit 346 with the resultant signal being output on lines 348, 350. This goes to the main summing junction of the circuit at 400 for one gimbal axis and 402 for the remaining gimbal axis. It is to be noted that the terms for both axes are supplied with offset adjustment 352, 354 for the end that the zero terms will be treated as zero and not as a small number.

It will be understood that this completes the generation of the linear and non-linear damping term. The linear and non-linear spring term will next be set forth.

It will be noted that the output of amplifier 312 is fed to a power circuit 360. This takes $\alpha^2$ plus $\beta^2$ and raises it to the 3.34 power. Pot 368 adds the offset adjustment which again is proportional to $k_X$ for the pendulum P. Variable resistor 364 provides an adjustable non-linear spring constant, $k_{SP}$.

The output then passes to multiplier 370 where the necessary multiplication times the displacement occurs for the spring constant. Output at lines 372, 374 occurs to the respective summing junctions 400, 402 for each of the gimbal axes.

This completes the generation of the complete spring term.

Integration is believed to be conventional. Displacement terms feed to amplifiers 380, 382 which effect integration of the displacement with respect to time. A conventional reset 384 for the integration term is provided for system start-up—as where the pendulum P is initially caged.

It will be understood that the summing functions at junctions 400, 402 effect the introduction of the terms at various magnitudes—dependent upon the magnitude of the components necessary to generate desirable component performance. Here the summing junction is of the inverting type. The integral term is divided by three. The spring term is multiplied times two. The loop offset is provided at variable pots 376, 378 and is fed to the summing junction in a divide by 10 function. Finally, the damping term is multiplied by ten.

It is required that various reference voltages be supplied that are substantially free of power supply drift. Accordingly, a relative constant voltage output from circuit 314 is buffered at amplifier 390 and provides at 292 the required one volt reference that is substantially independent of the system power supply for circuits 304, 306, 314, 360, 370. Likewise, amp 394 provides a plus four volt reference at 396 and amp 398 a negative four volt reference at 300 for generation of terms at 326, 352, 354, 368, 378.

It can be seen from the description that there has been provided a unique restoring protocol for a pendulum type stabilizer. It will be understood here that the equations set forth constitute approximations. Other equations may do as well provided that those equations impose substantially linear responses in the central region and increasing and/or exponential resistances as the pendulum approaches excursion extremes.

I claim:

1. An optical stabilizer having an optical axis, said optical stabilizer including:
    a case mounted on said optical axis;
    at least one stationary optical element mounted to said case on said optical axis;
    a movable optical element mounted to said case on said optical axis, said movable optical element being movable towards and away from a neutral position within an optically stabilized region and towards and away from mechanical stops positioned outside of said optically stabilized region with respect to said optical axis and responsive to an ambient angular motion of said case;
    said movable optical element upon being moved having an optical effect with said at least one stationary optical element to produce image motion of an image which is equal and opposite to image motion of said image caused by said ambient angular motion of said case so as to stabilize said image;
    a sensor for detecting movement of said movable optical element, said sensor emitting a sensor signal indicating said movement;
    first conduit means operably connected to said sensor for receiving said sensor signal and generating a first signal proportional to a non-linear displacement dependent second order force for restoring said movable optical element to said neutral position, the characteristic of said non-linear displacement dependent second order force providing for a slowly increasing restoring force applied to said movable optical element in the optically stabilized region surrounding said neutral position changing to a rapidly increasing restoring force in the regions outside of said optically stabilized region and approaching the mechanical stops;
    second circuit means connected to said sensor for receiving said signal therefrom and generating a second signal proportional to a non-linear first order force;
    third circuit means for combining said first and second signals into a resultant signal; and
    means for applying a variable force to said movable optical element, said means for applying said variable force being attached to said case, said means for applying a variable force receiving said resultant signal from said third circuit means and causing said movable optical element to return to said neutral position when said case receives said ambient angular motion.

2. The invention of claim 1 wherein said movable optical element mounted to said case on said optical axis is stabilized by a gyro, and wherein said second order force for restoring said movable optic element is proportional to an integral of a first order force with respect to time.

3. The invention of claim 1 and wherein said movable optical element mounted to said case on said optical axis constitutes a neutrally balanced pendulum, and said non linear displacement dependent second order force for restoring said movable optical element is position dependent.

4. The invention of claim 1 and wherein said first circuit means uses a second order force constant to obtain said non-linear second order force;
    wherein said second circuit means uses a first order force constant to obtain said non-linear first order force; and
    wherein said second order force constant for said second order force and said first order force constant for said first order force are selected so as to achieve a critical damping function of said movable optical element mounted to said case.

5. An optical stabilizer having an optical axis, said optical stabilizer comprising:
    a case mounted on an optical axis;
    a stationary optical element mounted to said case on said optical axis;
    a movable optical element mounted to said case on said optical axis, said movable optical element being movable towards and away form a neutral position within an optically stabilized region and towards and away from mechanical stops positioned outside of said optically stabilized region with respect to said optic axis and responsive to an ambient angular motion of said case;
    said movable optical element upon being moved having an optical effect with said stationary optical element to produce image motion of an image which is equal and opposite to image motion of said image caused by said ambient angular motion of said case so as to stabilize said image;
    a sensor for detecting radial movement only of said movable optical element, said sensor emitting a sensor signal indicating he magnitude of said radial movement only;
    first circuit means for generating a first signal proportional to said sensor signal including a component proportional to a non-linear displacement dependent second order force for restoring said movable optical element to said neutral position, the characteristic of said non-linear displacement dependent second order force providing for a slowly increasing restoring force applied to said movable optical element in the optically stabilized region surrounding said neutral position changing to a rapidly increasing restoring force in the regions outside of said optically stabilized region and approaching the mechanical stops; and means for applying a radial variable force only to said movable optical element, said means for applying said radial variable force being attached to said case and being operatively coupled to said first circuit means for receiving said first signal, said means for applying a radial variable force being responsive to said first signal for causing said movable optical element to return to said neutral position when said case receives said ambient angular motion.

6. The invention of claim 5 and wherein said case is connected to a camera; and said movable optical element effects camera stabilization.

7. The invention of claim 5 and wherein said movable optical element is attached to a neutrally balanced pendulum.

8. The invention of claim 5 and including second circuit means for generating a second signal proportional to a non-linear first order force; and third circuit means for combining said first and second signals.

9. The invention of claim 8 and wherein said first circuit means uses a second order force constant to obtain said non-linear second order force;

wherein said second circuit means uses a first order force constant to obtain said non-linear first order force; and said second order force constant and said first order force constant are selected so as to achieve a critical damping function of said movable optical element.

10. An optical stabilizer having an optical axis, said optical stabilizer including:

a case mounted on an optical axis;

at least on stationary optical element mounted to said case on said optical axis;

a movable optical element mounted to said case on said optical axis, said movable optical element being movable towards and away from a neutral position within an optically stabilized region and towards and away from mechanical stops outside of said optically stabilized region with respect to said optical axis and responsive to an ambient angular motion of said case;

said movable optical element upon being moved having an optical effect with at least one stationary optical element to produce image motion of an image which is equal and opposite to image motion of said image caused by said ambient angular motion of said case, thereby stabilizing said image;

said movable optical element being mounted for movement on gimbals, said gimbals having at least two pivot axes with said axes being substantially normal to the optical axis of said optical stabilizer and non-coincident;

means for mounting said gimbals on said case;

first and second sensors for determining the movement of said movable optical element from said neutral position relative to said gimbal axes and each of said sensors emitting a signal for indicating said movement;

first circuit means responsive to said signals from said first and second sensors for generating a first signal proportional to a non-linear displacement dependent second order force for restoring said movable optical element to said neutral position, the characteristic of said non-linear displacement dependent second order force providing for a slowly increasing restoring force applied to said movable optical element in the optically stabilized region surrounding said neutral position changing to a rapidly increasing restoring force in the regions outside said optically stabilized region and approaching the mechanical stops of said movable optical element; and means responsive to said first signal generated by said first circuit means for applying a variable force to said movable optical element, said means for applying a variable force acting on at least one gimbal axis.

11. The invention of claim 10 and further comprising:

second circuit means responsive to said signals from said first and second sensors for generating a signal proportional to a first order force; and means for communicating said second circuit means with said means for applying a variable force.

12. The invention of claim 10 and wherein said movable optical element is stabilized by a gyroscope.

13. The invention of claim 10 and wherein said movable optical element is stabilized by a neutrally balanced pendulum.

14. The invention of claim 10 and wherein said first and second sensors are in the plane determined by the two axes of the gimbals.

15. The invention of claim 10 and wherein said means for applying a variable force to said optical element is in the plane determined by the two axes of the gimbals.

16. The invention of claim 10 and including a second means for applying a variable force to said movable optical element different from said first means for applying a variable force to said moving optical element, said first and second means apply variable forces on both said gimbal axes.

17. A pendulum type optical stabilizer having an optical axis, said pendulum type optical stabilizer including:

an optical instrument to be optically stabilized, said optical instrument mounted on said optical axis and including a lens train for receiving light to be stabilized relative to a principal optical axis;

an inertial pendulum;

gimbals operatively coupled to said inertial pendulum, said gimbals having first and second pivot axes disposed at right angles with respect to each other, said gimbals being positioned with respect to said pendulum to cause substantially neutral balance of said pendulum with respect to said gimbals;

means for mounting said gimbals on said optical instrument to be stabilized;

at least first and second relatively moving optical elements for producing stabilizing deflection of light passing therethrough, said first optical element being provided with means for attachment to and movement with said optical instrument to be stabilized, said second optical element being attached to said inertial pendulum for normal positioning adjacent to the front of said optical instrument to be stabilized;

first and second means for sensing angular movement of said gimbals with respect to said optical instrument, said first and second means for outputting respective first and second signals proportional to the displacement of said first and second pivot axes of said gimbals;

circuit means for generating signals proportional to a non-linear displacement dependent spring force for restoring said pendulum to a neutral position, said circuit means having an output and first and second inputs, said first input being connected to said first means for sensing the angular displacement of one gimbal axis, and said second input being connected to said second means for sensing the angular displacement of the other gimbal axis; and means operably connected to the output of said circuit means for exerting variable torque across at least one axis of said gimbals whereby non-linear displacement dependent spring force for the imposition of restoring forces to said gimbal axes are imposed as a function of the displacement of both said gimbal axes.

18. The invention of claim 17 and including a second circuit means for generating signals proportional to non-linear displacement dependent spring forces, said second circuit means having an output and first and second inputs, said first and second inputs operatively connected to said respective first and second means for sensing the angular displacement of said gimbals; and further including second means for exerting variable torque across the other axis of said gimbals operatively connected to the output of said second circuit means whereby the spring force for the imposition of restoring forces on the other of said gimbal axis includes linear and non-linear components.

19. The invention of claim 17 and including integration circuit means having an input from said first means for sensing the angular displacement of said gimbals, said integration means having an output at said means for exerting variable torque across said at least one axis of said gimbals.

20. The invention of claim 19 and wherein said integration circuit means is linear with respect to said displacement of said gimbals only.

* * * * *